United States Patent
Yamagishi et al.

(10) Patent No.: US 11,316,246 B2
(45) Date of Patent: Apr. 26, 2022

(54) ANTENNA DEVICE AND DISPLAY DEVICE PROVIDED WITH SAME

(71) Applicant: SHARP KABUSHIKI KAISHA, Sakai (JP)

(72) Inventors: Shinji Yamagishi, Sakai (JP); Hiroshi Fukushima, Sakai (JP); Yasuhiro Sugita, Sakai (JP); Kazutoshi Kida, Sakai (JP); Takenori Maruyama, Sakai (JP); Jean Mugiraneza, Sakai (JP); Takuma Yamamoto, Sakai (JP); Yukio Mizuno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 117 days.

(21) Appl. No.: 16/810,043

(22) Filed: Mar. 5, 2020

(65) Prior Publication Data
US 2020/0295435 A1    Sep. 17, 2020

Related U.S. Application Data

(60) Provisional application No. 62/816,360, filed on Mar. 11, 2019.

(51) Int. Cl.
| | |
|---|---|
| *H01Q 1/24* | (2006.01) |
| *H01Q 1/22* | (2006.01) |
| *H01Q 15/14* | (2006.01) |
| *H04B 5/02* | (2006.01) |
| *H01Q 1/36* | (2006.01) |

(52) U.S. Cl.
CPC ............. *H01Q 1/2216* (2013.01); *H01Q 1/22* (2013.01); *H01Q 1/24* (2013.01); *H01Q 1/36* (2013.01); *H01Q 15/14* (2013.01); *H04B 5/02* (2013.01)

(58) Field of Classification Search
CPC H01Q 1/24; H01Q 1/36; H01Q 15/14; H01Q 1/2216; H01Q 1/38; H01Q 1/2258; H01Q 1/22; H04B 5/02
USPC ........................................................ 343/720
See application file for complete search history.

(56) References Cited

U.S. PATENT DOCUMENTS

2006/0208949 A1* 9/2006 Hirabayashi ............. H01Q 1/38
                                                           343/702
2010/0283698 A1    11/2010 Orihara et al.
(Continued)

FOREIGN PATENT DOCUMENTS

| CN | 103782446 A | 5/2014 |
|---|---|---|
| CN | 104951128 A | 9/2015 |

(Continued)

*Primary Examiner* — Hai V Tran
(74) *Attorney, Agent, or Firm* — ScienBiziP, P.C.

(57) ABSTRACT

There are provided an antenna device with improved antenna performance while suppressing a decrease in yield and a decrease in viewability, and a display device including the same. The antenna device includes an antenna substrate, a first antenna pattern formed on a first main surface of the antenna substrate, and a second antenna pattern formed on a second main surface opposite to the first main surface of the antenna substrate. The first antenna pattern and the second antenna pattern are formed such that positions on the front and back of the antenna substrate coincide with each other, and at least a part of the antenna substrate is transparent to transmit an image.

8 Claims, 27 Drawing Sheets

(56) References Cited

U.S. PATENT DOCUMENTS

| | | | |
|---|---|---|---|
| 2014/0198011 A1* | 7/2014 | Tsubaki | H01Q 1/243 |
| | | | 343/867 |
| 2014/0328084 A1* | 11/2014 | Chuang | H01Q 7/00 |
| | | | 362/623 |
| 2015/0277634 A1* | 10/2015 | Oem | G06F 3/046 |
| | | | 345/173 |
| 2016/0013556 A1* | 1/2016 | Kato | H01Q 9/27 |
| | | | 343/702 |
| 2016/0118616 A1* | 4/2016 | Hiroki | H01L 51/0097 |
| | | | 257/40 |
| 2016/0226128 A1 | 8/2016 | Uraki et al. | |
| 2016/0299601 A1* | 10/2016 | Yamazaki | G06F 3/0412 |
| 2017/0170875 A1 | 6/2017 | Cheikh et al. | |

FOREIGN PATENT DOCUMENTS

| | | |
|---|---|---|
| CN | 106537687 A | 3/2017 |
| CN | 107748594 A | 3/2018 |
| CN | 108140941 A | 6/2018 |
| JP | 2009-105774 A | 5/2009 |
| JP | 2016-010493 A | 1/2016 |
| JP | 2016-143971 A | 8/2016 |

\* cited by examiner

FIG. 13

| | PERFORMANCE OF SECOND EMBODIMENT | | PERFORMANCE OF COMPARATIVE EXAMPLE | |
|---|---|---|---|---|
| | EMVCo PERFORMANCE | CURRENT VALUE | EMVCo PERFORMANCE | CURRENT VALUE |
| FIRST EXAMPLE | 3.52 V | 0.317 A | 3.50 V | 0.313 A |
| SECOND EXAMPLE | 3.35 V | 0.316 A | 3.31 V | 0.313 A |
| THIRD EXAMPLE | 3.63 V | 0.355 A | 3.60 V | 0.350 A |
| FOURTH EXAMPLE | 3.62 V | 0.357 A | 3.60 V | 0.357 A |
| FIFTH EXAMPLE | 3.82 V | 0.367 A | 3.81 V | 0.385 A |
| SIXTH EXAMPLE | 3.59 V | 0.366 A | 3.58 V | 0.365 A |

FIG. 26

|  | PERFORMANCE OF THIRD EMBODIMENT ||
|---|---|---|
|  | EMVCo PERFORMANCE | CURRENT VALUE |
| FIRST EXAMPLE | 3.30 V | 0.311 A |
| SECOND EXAMPLE | 3.80 V | 0.365 A |
| THIRD EXAMPLE | 3.75 V | 0.348 A |
| FOURTH EXAMPLE | 3.32 V | 0.347 A |
| FIFTH EXAMPLE | 3.63 V | 0.352 A |
| SIXTH EXAMPLE | 3.59 V | 0.349 A |

ANTENNA DEVICE AND DISPLAY DEVICE PROVIDED WITH SAME

BACKGROUND

1. Field

The present disclosure relates to an antenna device, particularly to an antenna device including an antenna for near field communication, and a display device provided with the antenna device.

2. Description of the Related Art

In recent years, a technique has been used for performing near field communication between an IC card (non-contact type IC card), which do not include a power supply and has a built-in antenna element for wireless communication, and a communication device, which has a power supply, without contact between the IC card and the communication device. For example, when wireless communication (near field communication) is performed between the communication device and the non-contact type IC card, the non-contact type IC card is brought close to the communication device such that the distance between the antenna element of the communication device and the non-contact type IC card is equal to or less than a predetermined distance. The communication device has a power supply, and supplies power to the near field communication antenna element built in the communication device, which may lead to generation of a magnetic field by the antenna element. Then, by bringing the non-contact type IC card close to the communication device, the magnetic field is generated by the communication device, and thus an induced current flows through the antenna element of the non-contact type IC card. Accordingly, power can be supplied from the communication device to the non-contact type IC card. Then, the non-contact type IC card operates a circuit (for example, an IC chip) in the non-contact type IC card by using the electromotive force generated by the induced current. In this way, by bringing the non-contact type IC card close to the communication device, it is possible to perform wireless communication (near field communication) between the con-contact type IC card and the communication device.

For example, Japanese Unexamined Patent Application Publication No. 2016-10453 discloses a display device in which the above-described communication device is provided on the back surface (surface opposite to the display surface) side of a display panel. In the display device, when a user brings the non-contact type IC card close to the display surface of the display device, the non-contact type IC card and the communication device performs wireless communication with each other in a state of the display panel being interposed therebetween.

However, in the display device, since the display panel is interposed between the non-contact type IC card and the communication device, the communication distance cannot be shortened, which may make wireless communication difficult.

On the other hand, when the communication device that transmits an image is provided on the display surface side of the display device, the distance between the non-contact type IC card and the communication device can be reduced. However, in this case, the parasitic capacitance between the antenna included in the communication device and the display panel increases and the antenna performance deteriorates, which may make wireless communication difficult.

When a communication device that transmits an image is provided on the display surface side of the display device, as one of the methods for improving the antenna performance, a method of forming a thick conductor constituting the antenna pattern to reduce resistance can be considered. However, as the thickness of the conductor is designed to be larger, the variation of the thickness is increased and so on, and thus the yield is decreased and the viewability of the image is deteriorated.

According to an aspect of the disclosure, there is provided an antenna device including an antenna substrate, a first antenna pattern formed on a first main surface of the antenna substrate, and a second antenna pattern formed on a second main surface opposite to the first main surface of the antenna substrate. The first antenna pattern and the second antenna pattern are formed such that positions on the front and back of the antenna substrate coincide with each other, and at least a part of the antenna substrate is transparent to transmit an image.

BRIEF DESCRIPTION OF THE DRAWINGS

FIG. 13 is a table showing comparisons between performances of antenna configuration examples in the second embodiment and performances of comparative examples;

FIG. 26 is a table showing performances of antenna configuration examples in the third embodiment.

DESCRIPTION OF THE EMBODIMENTS

Figure 1:
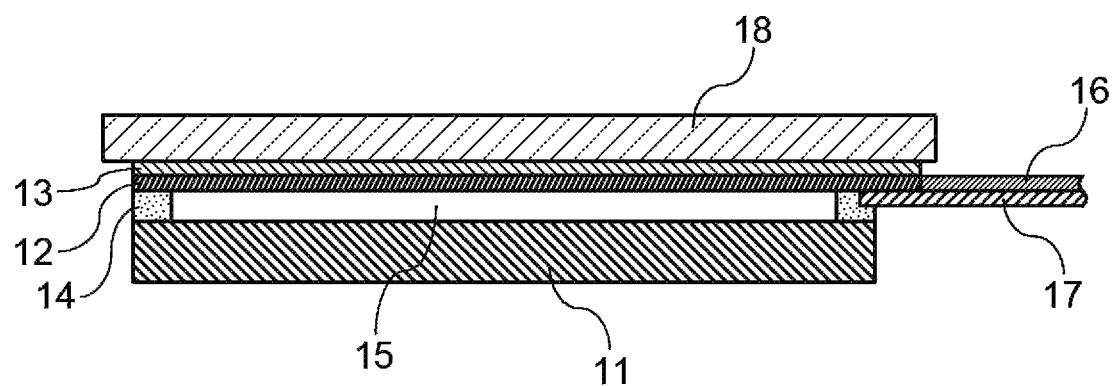
FIG. 1 is a cross sectional view illustrating a schematic configuration of a liquid crystal display device 1 according to a first embodiment.

Hereinafter, embodiments of the present disclosure will be described in detail with reference to the drawings. In the drawings, the same or corresponding portions will be denoted by the same reference numerals, and thus the description thereof will not be repeated. In addition, for the purpose of easy understanding of description, in the drawings referred to below, configurations are shown in a simplified or schematic manner, or some components are omitted. Furthermore, the dimensional ratios between the components shown in each drawing do not necessarily indicate actual dimensional ratios.

First Embodiment

FIG. 1 is a cross-sectional view illustrating a schematic configuration of a liquid crystal display device 1 according to a first embodiment. As illustrated in FIG. 1, the liquid crystal display device 1 includes a stack configuration of a liquid crystal module 11, an antenna layer 12, a touch panel 13, and a cover glass 18. The antenna layer 12 is adhered to the liquid crystal module 11 through an adhesive member 14. As the adhesive member 14, for example, a double-sided tape or the like can be used. In the example shown in FIG. 1, since the adhesive member 14 has a certain thickness, an air gap 15 is formed between the liquid crystal module 11 and the antenna layer 12. However, there may be no air gap 15.

The antenna layer 12 in the first embodiment has a near field communication (NFC) antenna for performing near field communication with an external device. However, the communication standard with the external device is not limited to NFC. A flexible printed circuits (FPC) board 16 is connected to an end of the antenna layer 12. Various configurations for performing near field communication, such as a reader/writer circuit (RW circuit) for outputting a drive waveform and an antenna adjustment substrate for adjusting the capacity of the antenna, can be connected to the end of the FPC board 16.

The antenna layer 12 is stacked between the liquid crystal module 11 and the touch panel 13. It is to be noted that the touch panel 13 may be omitted. The cover glass 18 are stacked on the touch panel 13. It is also to be noted that the cover glass 18 may be omitted.

Further, in the configuration illustrated in FIG. 1, a ferrite sheet 17 having a magnetic field shielding effect, is provided on the FPC board 16 on the side where the liquid crystal module 11 is provided (the lower side in the figure). It is to be noted that the ferrite sheet 17 may be omitted, and can be replaced with another sheet having a magnetic field shielding effect.

The antenna layer 12 includes an antenna substrate 121 made of a synthetic resin material transparent to visible light, such as polyethylene terephthalate (PET). A first antenna pattern is formed on one main surface of the antenna substrate 121 (hereinafter, referred to as a "first main surface"), and a second antenna pattern is formed on the main surface opposite to the first main surface of the antenna substrate 121 (hereinafter, referred to as a "second main surface"). Further, an FPC board 16 is connected to each of the first main surface and the second main surface of the antenna layer 12. The first main surface of the antenna substrate 121 may be the surface on the near side of the liquid crystal module 11 (the lower surface in FIG. 1) or the surface on the opposite side thereof (the upper surface in FIG. 1). However, in the following, for the sake of specific description, the first main surface of the antenna substrate 121 is a surface on the opposite side of the liquid crystal module 11 (the upper surface in FIG. 1).

The first antenna pattern and the second antenna pattern are formed on the antenna substrate 121 by linearly patterning a mesh metal (reticulated metal film) made of a low-resistance metal such as copper.

The antenna substrate 12 is made of a material that transmits visible light. The mesh metal constituting the first antenna pattern and the second antenna pattern has many gaps, and makes it difficult for humans to view the fine metal wires. Therefore, the antenna layer 12 transmits an image displayed on the liquid crystal module 11. The first antenna pattern and the second antenna pattern may be constituted by a conductor capable of transmitting an image, such as Indium Tin Oxide (ITO).

Figure 2:
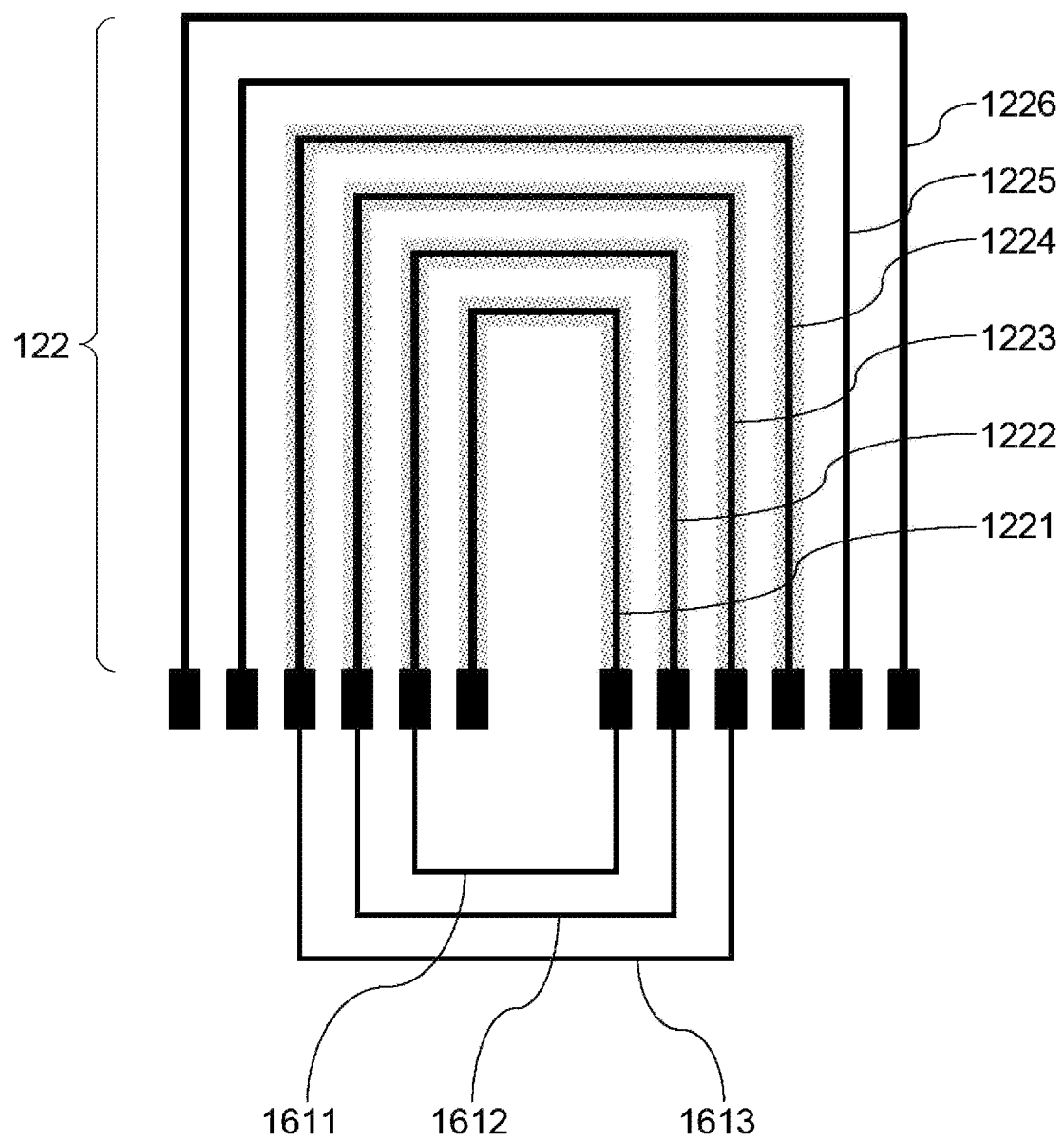
FIG. 2 is a schematic diagram illustrating an example of a first antenna pattern according to the first embodiment.
Figure 3:
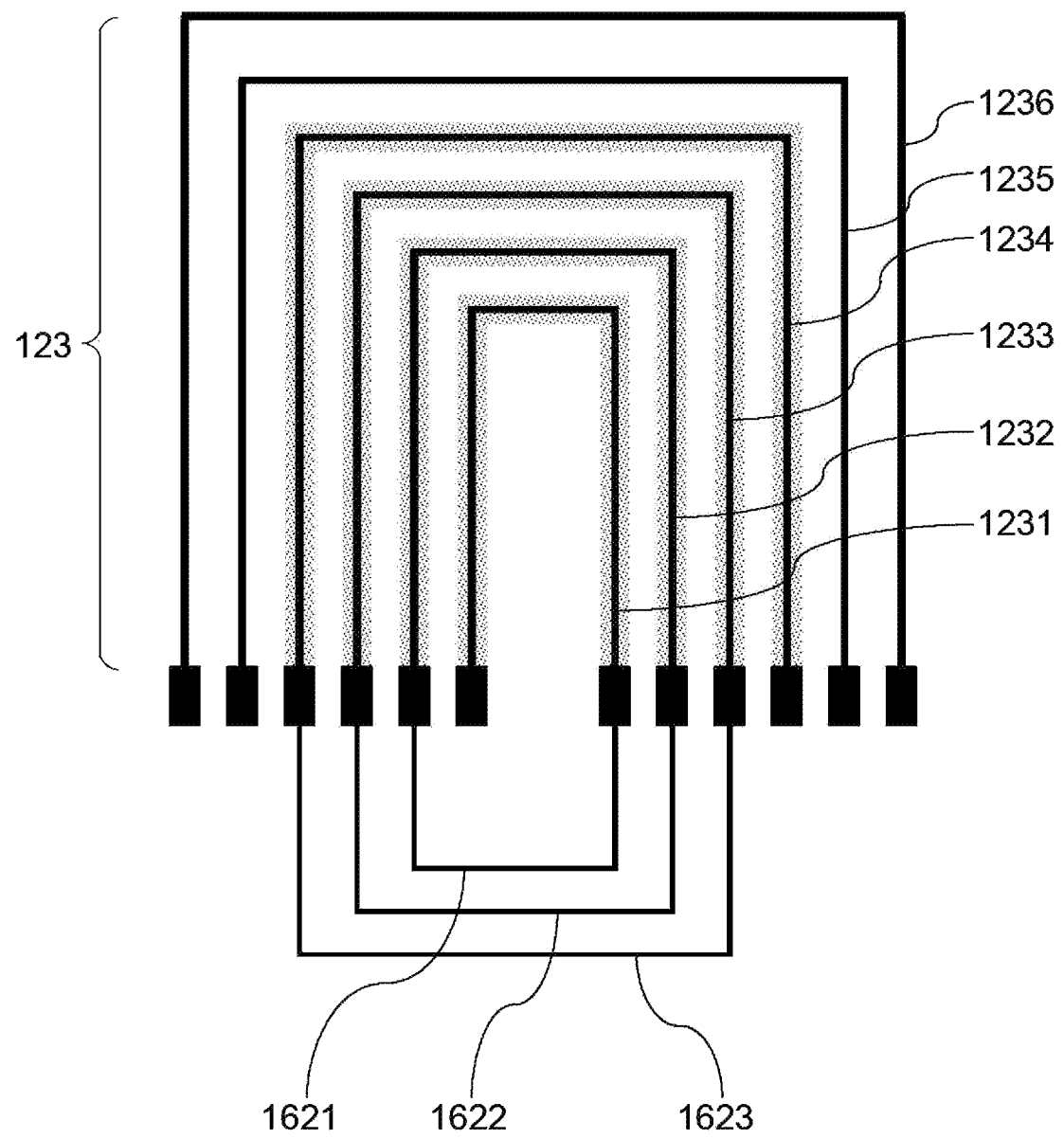
FIG. 3 is a schematic diagram illustrating an example of a second antenna pattern according to the first embodiment.

The shapes of the first antenna pattern and the second antenna pattern will be described with reference to FIG. 2 and FIG. 3. FIG. 2 is a schematic diagram illustrating an example of the first antenna pattern according to the first embodiment. FIG. 3 is a schematic diagram illustrating an example of the second antenna pattern according to the first embodiment. FIG. 2 and FIG. 3 are plan views of the antenna substrate 121 as viewed from the first main surface side. In the drawings illustrating the antenna patterns including FIGS. 2 and 3, hatching is displayed behind the antenna wires to illustrate the antenna wires constituting the antenna.

As illustrated in FIG. 2, the first antenna pattern 122 includes a plurality of nested U-shaped conductors. Specifically, the first, antenna pattern 122 includes six nested U-shaped antenna wires 1221 to 1226. Hereinafter, when the antenna substrate 121 is disposed such that the opening portions of the antenna wires 1221 to 1226 face downward in a plane viewed from the first main surface side (that is, when the antenna substrate 121 is disposed as shown in FIG. 2), the right end of each antenna wire is referred to as "one end", and the left end is referred to as "other end". In the description of antenna wires 1231 to 1236 of the second antenna pattern 123, which will be described below, ends thereof will be referred to as In the same manner.

As illustrated in FIG. 2, the antenna wires 1221 to 1224 included in the first antenna pattern 122 are electrically connected by connection lines 1611 to 1613 formed on the FPC board 16 to constitute an antenna. Specifically, the connection line 1611 connects one end of the antenna wire 1221 and the other end of the antenna wire 1222. The connection line 1612 connects one end of the antenna wire 1222 and the other end of the antenna wire 1223. The connection line 1613 connects one end of the antenna wire 1223 and the other end of the antenna wire 1224. Thus, the antenna wires 1221 to 1224 constitute a four-turn loop antenna.

As illustrated in FIG. 3, similarly to the first antenna pattern 122, the second antenna pattern 123 includes a plurality of nested U-shaped conductors. Specifically, the second antenna pattern 123 includes six nested U-shaped antenna wires 1231 to 1236. Particularly, the second antenna pattern 123 has the same shape as the first antenna pattern 122, and is formed exactly on the back side of the first antenna pattern 122 in the antenna substrate 121. In order words, the first antenna pattern 122 and the second antenna pattern 123 are formed such that the positions on the front and back of the antenna substrate 121 coincide with each other. In the first embodiment and the second and third embodiments to be described below, the fact that the positions of the first antenna pattern 122 and the second antenna pattern 123 on the front and back of the antenna substrate 121 coincide with each other does not mean strictly perfect match. Rather, it includes, for example, a case where the respective antenna wires constituting the first antenna pattern 122 and the second antenna pattern 123 are slightly shifted or different in width, or a case where there is an overlapping portion in all wires of the antenna.

As illustrated in FIG. 3, the antenna wires 1231 to 1234 included in the first antenna pattern 122 are electrically connected by connection lines 1621 to 1623 formed on the FPC board 16 to constitute the antenna. Specifically, the connection line 2621 connects one end of the antenna wire 1231 to the other end of antenna wire 1232. The connection line 1622 connects one end of the antenna wire 1232 to the other end of the antenna wire 1233. The connection line 1623 connects one end of the antenna wire 1233 to the other end of the antenna wire 1234. Thus, the antenna wires 1231 to 1234 constitute a four-turn loop antenna. In this way, the antenna wires 1231 to 1234 of the second antenna pattern 123 are connected in the same connection state as the antenna wires 1221 to 1224 of the first antenna pattern 122 to constitute a loop antenna having the same antenna pattern as the first antenna pattern 122. It is to be noted the fact that respective antenna wires constituting the first antenna pattern and the second antenna pattern are in the same connection state means that the combinations of the electrically connected antenna wires are the same as each other and, at the same time, the combinations of the electrically connected ends of the antenna wires are the same as each other.

The antenna wires 1225 and 1226 of the first antenna pattern 122 and the antenna wires 1235 and 1236 of the second antenna pattern 123 are each floating without connection by connection lines. It is to be noted that these antenna wires 1225, 1226, 1235, and 1236 do not have to be formed on the antenna substrate 121.

Next, the performance of the antenna layer 12 in the first embodiment will be described. In the first embodiment, the resonance frequency of the antenna is adjusted to be 14 MHz. The size of the antenna layer 12 is about 5 inches diagonally (approximately 12.7 cm), and the thickness of the antenna wires constituting each of the first antenna pattern 122 and the second antenna pattern 123 is about 5 µm, the line width is about 300 µm, and the distance between the antenna wires is about 50 µm.

Figure 4:
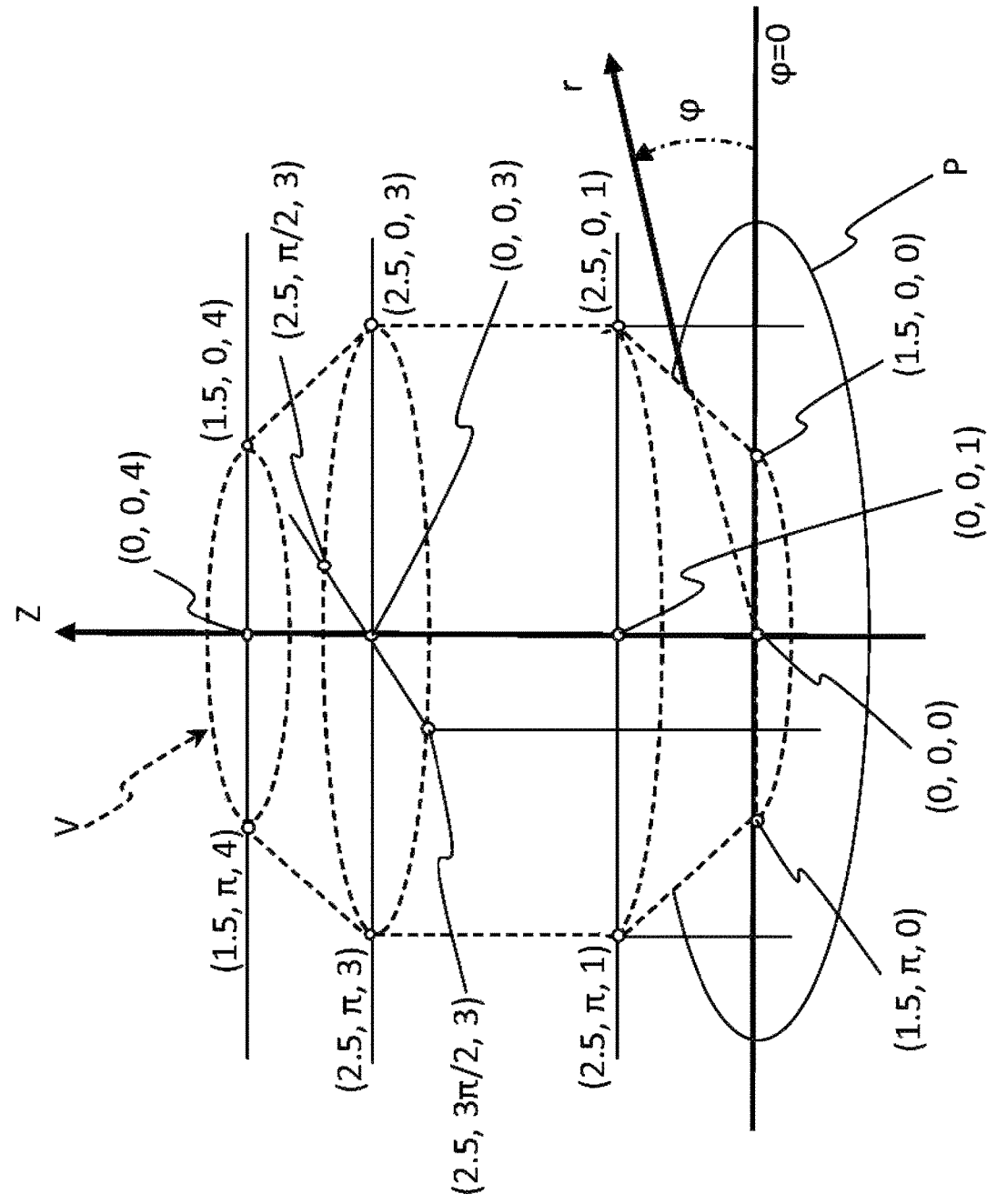
FIG. 4 is a schematic diagram illustrating a method of evaluating an EMVCo performance for measuring antenna performance.

In order to evaluate the performances of the antenna layer 12 in the first embodiment, a test was performed to determine whether or not performances required by the EMV specification were satisfied. The EMV specification is an international de facto standard for IC cards for financial transactions. The test whether the EMV specification was satisfied was performed by setting a predetermined receive antenna for the EMV standard test in parallel with the display surface of the liquid crystal display device 1 and at a distance of 40 mm from the display surface and measuring a peak value (EMVCo performance) of the amplitude of the output voltage of the antenna. In order for the display device provided with the antenna device to satisfy the EMV specification, the peak value of the output voltage of the receive antenna, which is located at a distance of 40 mm upward from the display surface in the direction normal to the display surface, may be 2.55 V or more. However, in order to clear the EMVCo performances in the entire operation space V indicated by the broken line in FIG. 4, the peak value of the output voltage of the receive antenna located at the distance of 40 mm upward from the display surface P in the normal direction needs to be 3.0 V or more. It is to be noted that each coordinate (r, φ, z) on the operation space V illustrated in FIG. 4 represents a radial position r in the display surface P, an angle φ from a reference position in the display surface P, and a height z in the normal direction of the display surface P.

In the configurations illustrated in FIGS. 2 and 3, the EMVCo performance was 2.93 V, and the current value when the output voltage value was obtained was 0.349 A.

On the other hand, when only the first antenna pattern 122 is provided on the antenna substrate 121 and the thickness of the antenna wire is 5 µm (same as the first embodiment), the EMVCo performance is 1.83 V, and the current value at the time when the output voltage value was obtained was 0.194 A. In addition, when only the first antenna pattern 122 was provided on the antenna substrate 121 and the thickness of the antenna wire was 10 µm (twice the thickness in the first embodiment), the EMVCo performance was 2.91 V, and the current value at the time when the output voltage value was obtained was 0.345 A.

As described above, when the same antenna pattern is formed on both surfaces of the antenna substrate 121, the current value is increased and the resistance of the antenna is reduced as compared with the case where the antenna pattern is formed on one surface of the antenna substrate 121. Particularly, when the same antenna pattern is formed on both surfaces of the antenna substrate 121, the resistance of the antenna is reduced to about the same degree as in the case where the thickness of the antenna wire formed on one surface of the antenna substrate 121 is doubled.

As described above, according to the configuration of the first embodiment, by forming the same antenna pattern on both surfaces of the antenna substrate 121, it is possible to reduce the resistance and improve the antenna performance without increasing the thickness of the antenna layer. Therefore, it is possible to improve antenna performance while suppressing a decrease in yield and a decrease in viewability.

Figure 5:
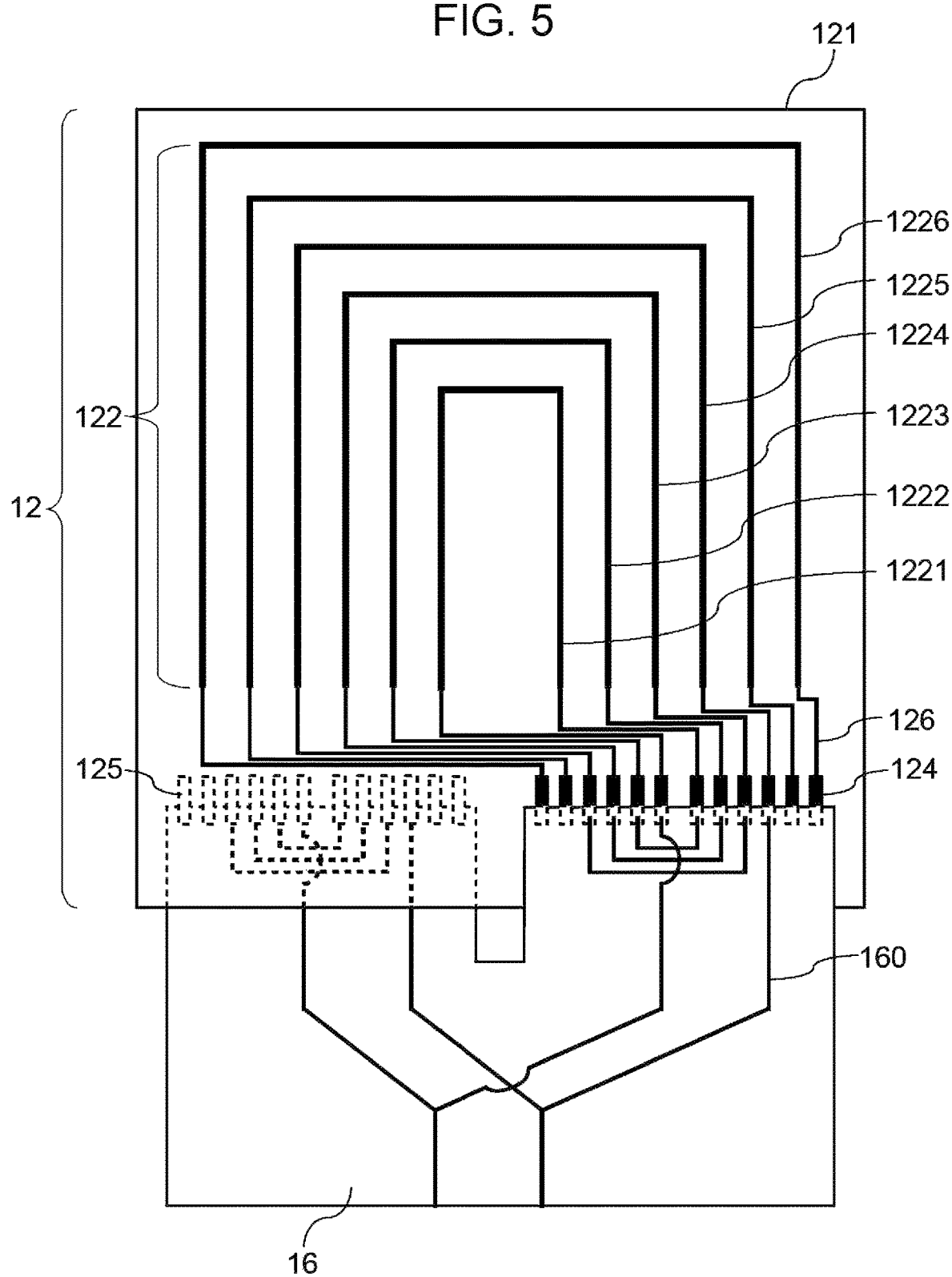
FIG. 5 is a schematic diagram illustrating an example of a method of connecting a flexible printed circuits (FPC) board 16 to an antenna layer 12.
Figure 6:
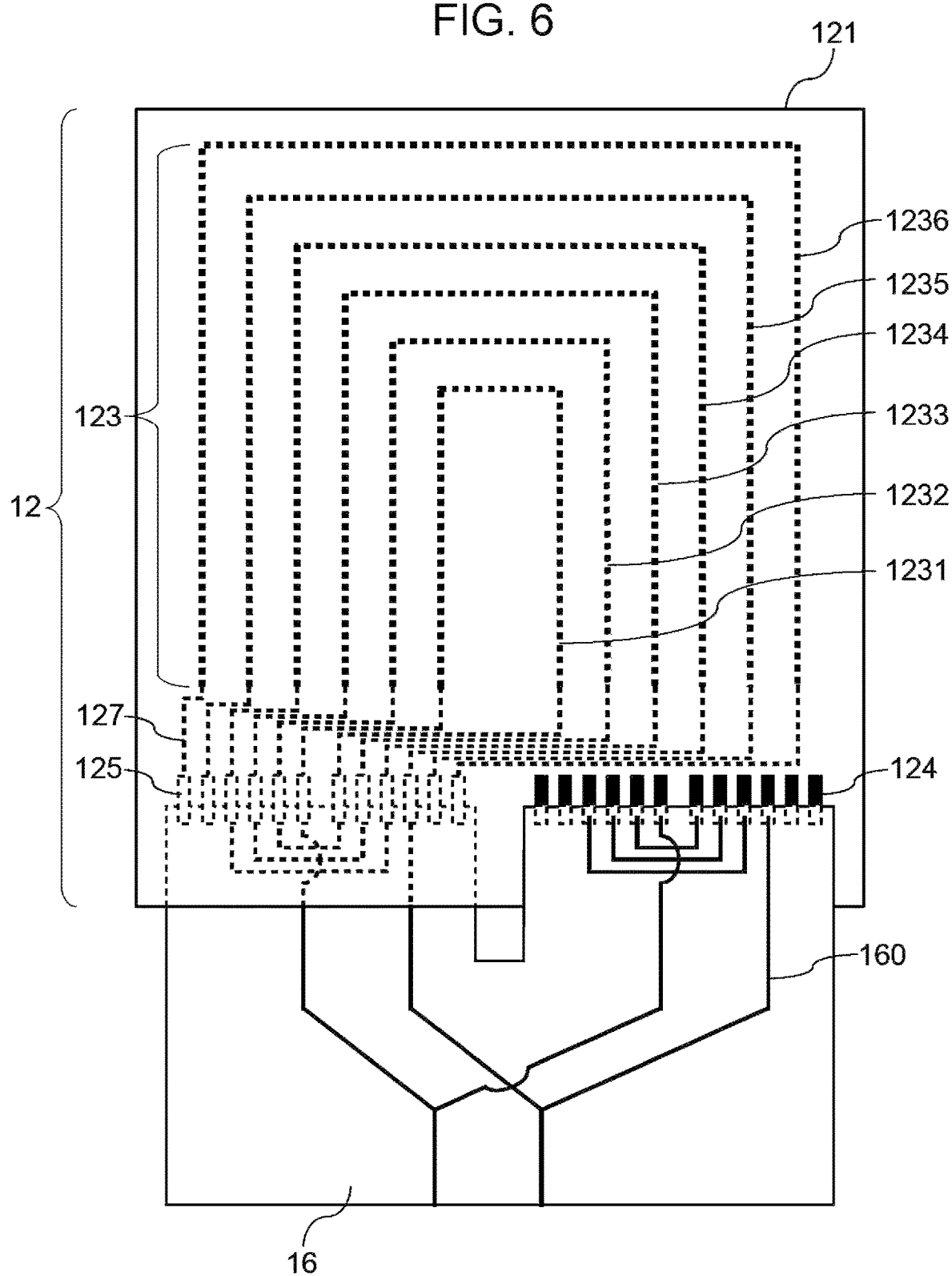
FIG. 6 is a schematic diagram illustrating an example of a method of connecting an FPC board 16 to an antenna layer 12.

It is to be noted that as a method for connecting the FPC board 16 to the antenna layer 12, connection methods illustrated in FIG. 5 and FIG. 6 may be employed. FIG. 5 and FIG. 6 are each schematic diagrams illustrating examples of the method of connecting an FPC board 16 to an antenna layer 12. FIG. 5 and FIG. 6 are each plan views of the antenna substrate 121 as viewed from the first main surface side. However, in FIG. 6, for convenience of illustration of the second antenna pattern 123 and second wirings 127 between the second antenna pattern 123 and second connection terminals 125, the illustration of the first antenna pattern 122 and first wirings 126 between the first antenna pattern 122 and first connection terminals 124 is omitted. In FIG. 5 and FIG. 6, a portion where a connection line 160 intersects without being connected to another connection line 160 is indicated by a curve as in a circuit diagram. It is to be noted that such non-connection intersections by the connection lines 160 can be implemented by forming the connection lines 160 in different layers using, for example, a multilayer FPC board 16.

As illustrated FIG. 5 and FIG. 6, on the first main surface of the antenna substrate 121, the first connection terminals 124 are formed which are electrically connected to the first antenna pattern 122 through the first wirings 126. In addition, on the second main surface of the antenna substrate 121, the second connection terminals 125 are formed which are electrically connected to the second antenna pattern 123 through the second wirings 127.

The first wirings 126 and the first connection terminals 124 are formed in the same number as the total number of the ends and the other ends of the antenna wires 1221 to 1226 such that the ends of the antenna wires 1221 to 1226 correspond to the other ends thereof in a one-to-one manner. In other words, one of the first wirings 126 is connected to one of each of the ends and the other ends of the antenna wires 1221 to 1226, and each of the first wirings 126 is connected to one first connection terminal 124.

Similarly, the second wirings 127 and the second connection terminals 125 are formed in the same number as the total number of the ends and the other ends of the antenna wires 1231 to 1236 such that the ends of the antenna wires 1231 to 1236 correspond to the other ends thereof in a one-to-one manner. In other words, one of the second wirings 127 is connected to one of each of the ends and the other ends of the antenna wires 1231 to 1236, and each of the first wirings 126 is connected to one second connection terminal 125.

The FPC board 16 is connected to the antenna substrate 121 by thermocompression bonding or the like. Each of the first connection terminal 124 and the second connection terminal 125 is electrically connected to a connection line 160 formed on the FPC board 16. Then, as illustrated in FIGS. 2 and 3, the antenna wires are electrically connected by the connection lines 160 to constitute the antenna.

In FIG. 5 and FIG. 6, the first connection terminals 124 are formed at positions different from the second connection terminals 123 on the front and back of the antenna substrate 121. With such a configuration, when a flexible wiring board such as the FPC board 16 is used, just by bending one board and connecting it to each of the first main surface and the second main surface of the antenna substrate 121, it is possible to electrically connect an external device (for example, an RW circuit) to each of the first antenna pattern 122 and the second antenna pattern 123.

Particularly, as illustrated in FIG. 5 and FIG. 6, the first connection terminals 124 are intensively arranged on a part (the right end part in the illustrated example) of the antenna substrate 121, and the second connection terminals 125 are intensively arranged on another part (the left end in the illustrated example) of the antenna substrate 121 where the group of the first connection terminals 124 is not arranged. For example, the first connection terminals 124 and the second connection terminals 125 may be arranged such that the minimum rectangular area including the first connection terminals 124 and the minimum rectangular area including the second connection terminals 125 have no overlapping portion on the front and back of the antenna substrate 121. With such a configuration, since the FPC board 16 has one portion connected to the first main surface and one portion connected to the second main surface of the antenna substrate 121, it is possible to easily connect the FPC board 16 to the antenna substrate 121.

Second Embodiment

Next, a second embodiment will be described. The second embodiment is the same as the first embodiment in that the first antenna pattern 122 and the second antenna pattern 123 are formed such that the positions on the front and back of the antenna substrate 121 coincide with each other. The second embodiment is the same as the first embodiment in that the antenna wires included in the first antenna pattern 122 are connected by the connection lines formed on the FPC board 16 to constitute the antenna and the antenna wires included in the second antenna pattern 123 are connected by the connection lines formed on the FPC board 16 to constitute the antenna, and in that the connection state of the antennal wires included in the first antenna pattern 122 and the connection state of the antenna wires included in the second antenna pattern 123 coincide with each other on the front and back of the antenna substrate 121.

However, in each of the first antenna pattern 122 and the second antenna pattern 123, the second embodiment employs the repeater antenna technology.

The repeater antenna technology is a technology capable of expanding the power supply distance and power supply range while maintaining power supply efficiency, by disposing a reflector device between power transmitting device and the power receiving device, which resonates at the same frequency 33 the devices. For example, in the second embodiment, in each of the first antenna pattern 122 and the second antenna pattern 123, a main antenna of which the resonance frequency is adjusted to 14 MHz, and a repeater antenna of which the resonance frequency is adjusted to 20 MHz.

Hereinafter, some configuration examples of the antenna according to the second embodiment will be described. However, in the second embodiment, similarly to the first embodiment, the antenna configuration example in the first antenna pattern 122 and the antenna configuration example in the second antenna pattern 123 are the same. Therefore, only the antenna configuration example in the first antenna pattern 122 will be illustrated and described below.

First Example

Figure 7:
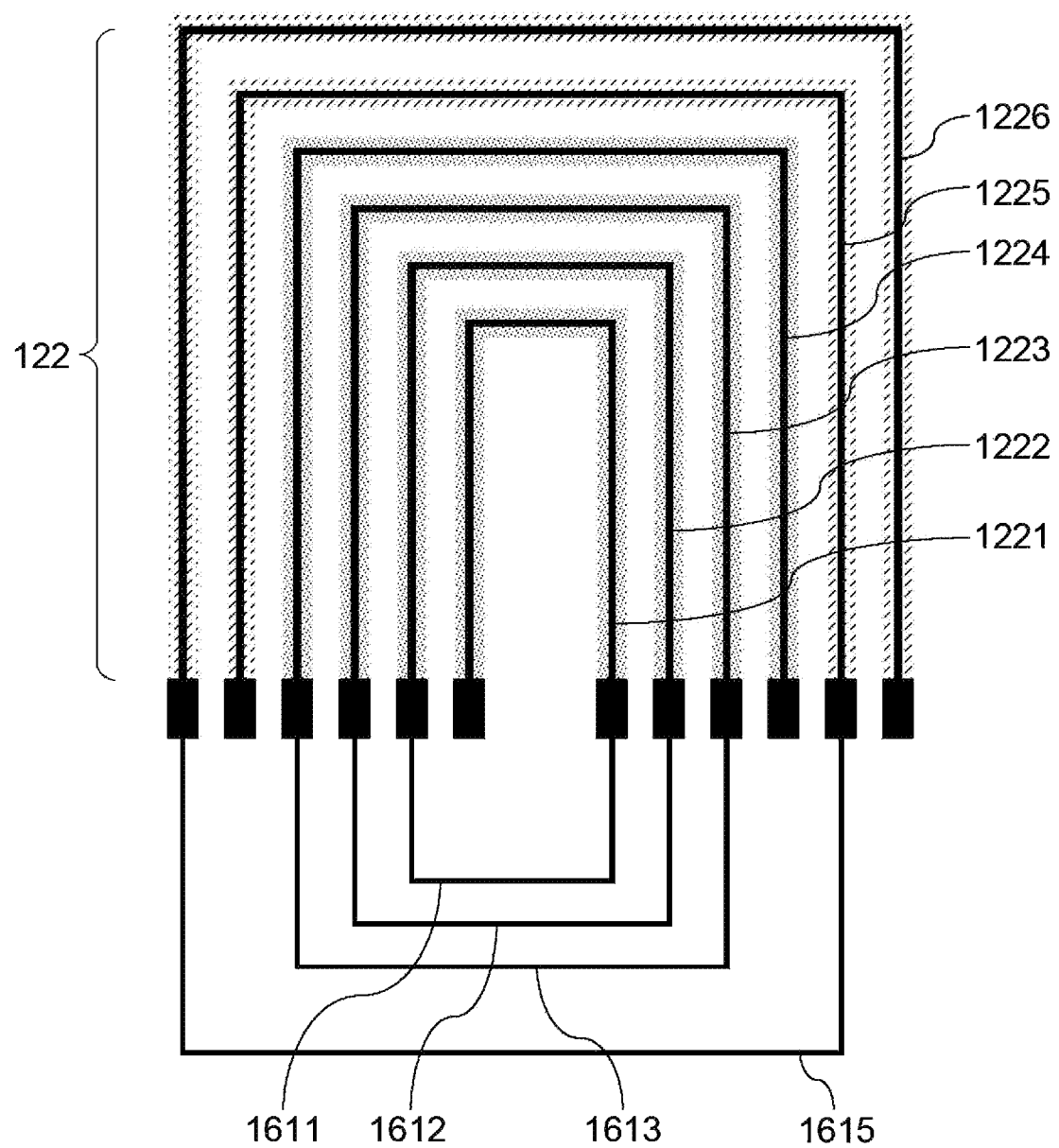
FIG. 7 is a schematic diagram illustrating an antenna configuration example (first example) of a first antenna pattern according to a second embodiment.

FIG. 7 is a schematic diagram illustrating an antenna configuration example (first example) of the first antenna pattern 122 according to the second embodiment. As illustrated in FIG. 7, the connection line 1611 connects one end of the antenna wire 1221 to the other end of antenna wire 1222. The connection line 1612 connects one end of the antenna wire 1222 to the other end of the antenna wire 1223. The connection line 1613 connects one end of the antenna wire 1223 to the other end of the antenna wire 1224. Thus, the antenna wires 1221 to 1224 constitute a four-turn loop antenna. In addition, the connection line 1615 connects one end of the antenna wire 1225 to the other end of the antenna wire 1226. Thus, the antenna wires 1225 and 1226 constitute a two-turn loop antenna.

In the example, the antenna wires 1221 to 1224 constitute a main antenna, and the antenna wires 1225 and 1226 constitute a repeater antenna.

Second Example

Figure 8:
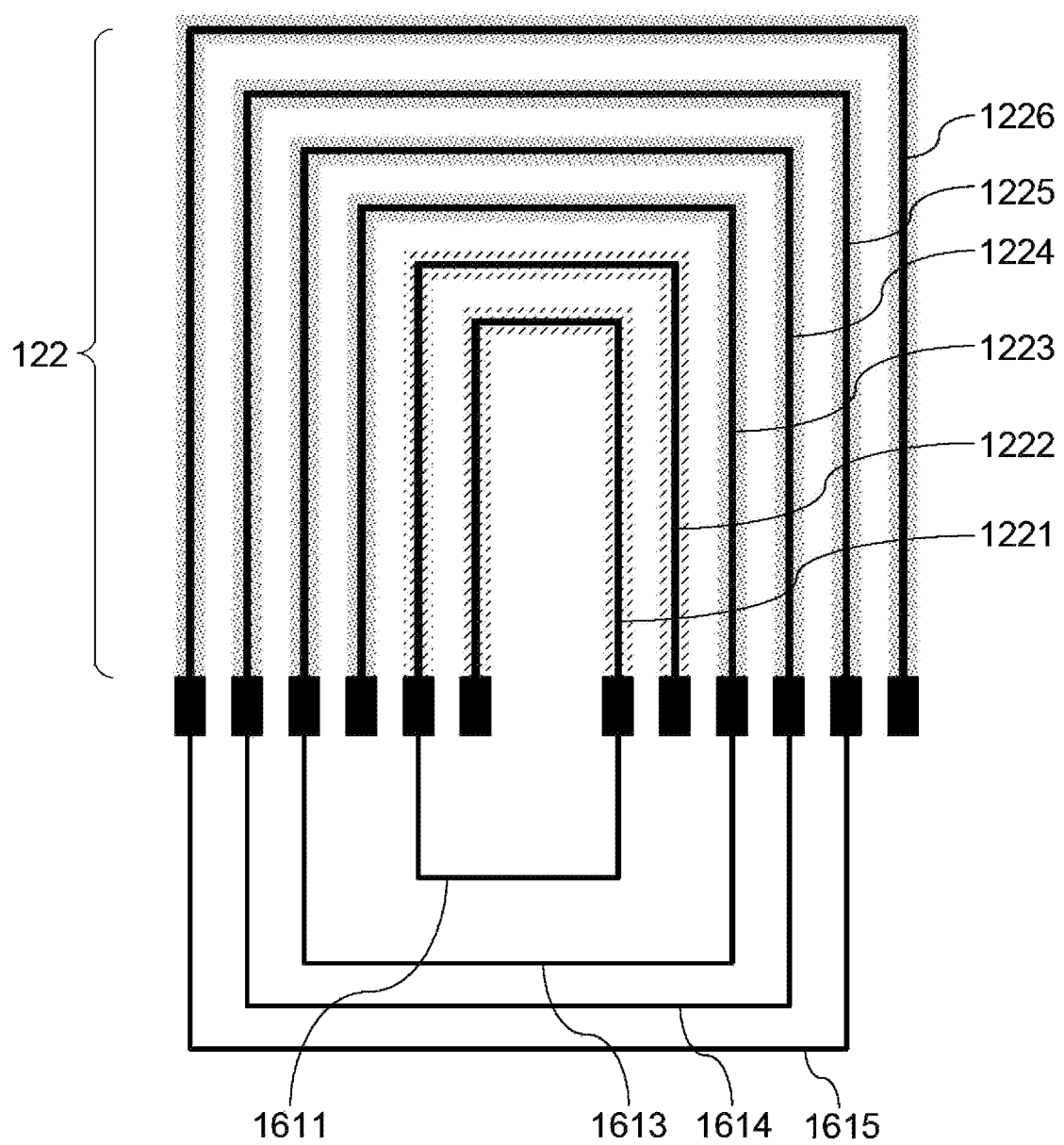
FIG. 8 is a schematic diagram illustrating an antenna configuration example (second example) of the first antenna pattern according to the second embodiment.

FIG. 8 is a schematic diagram illustrating an antenna configuration example (second example) of the first antenna pattern 122 according to the second embodiment. As illustrated in FIG. 8, the connection line 1611 connects one end of the antenna wire 1221 to the other end of the antenna wire 1222. Thus, the antenna wires 1221 and 1222 constitute a two-turn loop antenna. In addition, the connection line 1613 connects one end of the antenna wire 1223 to the other end of the antenna wire 1224. The connection line 1614 connects one end of the antenna wire 1224 to the other end of the antenna wire 1225. The connection line 1615 connects one end of the antenna wire 1225 to the other end of the antenna wire 1226. Thus, the antenna wires 1223 to 1226 constitute a four-turn loop antenna.

In the example, the antenna wires 1223 to 1226 constitute a main antenna, and the antenna wires 1221 and 1222 constitute a repeater antenna.

Third Example

Figure 9:
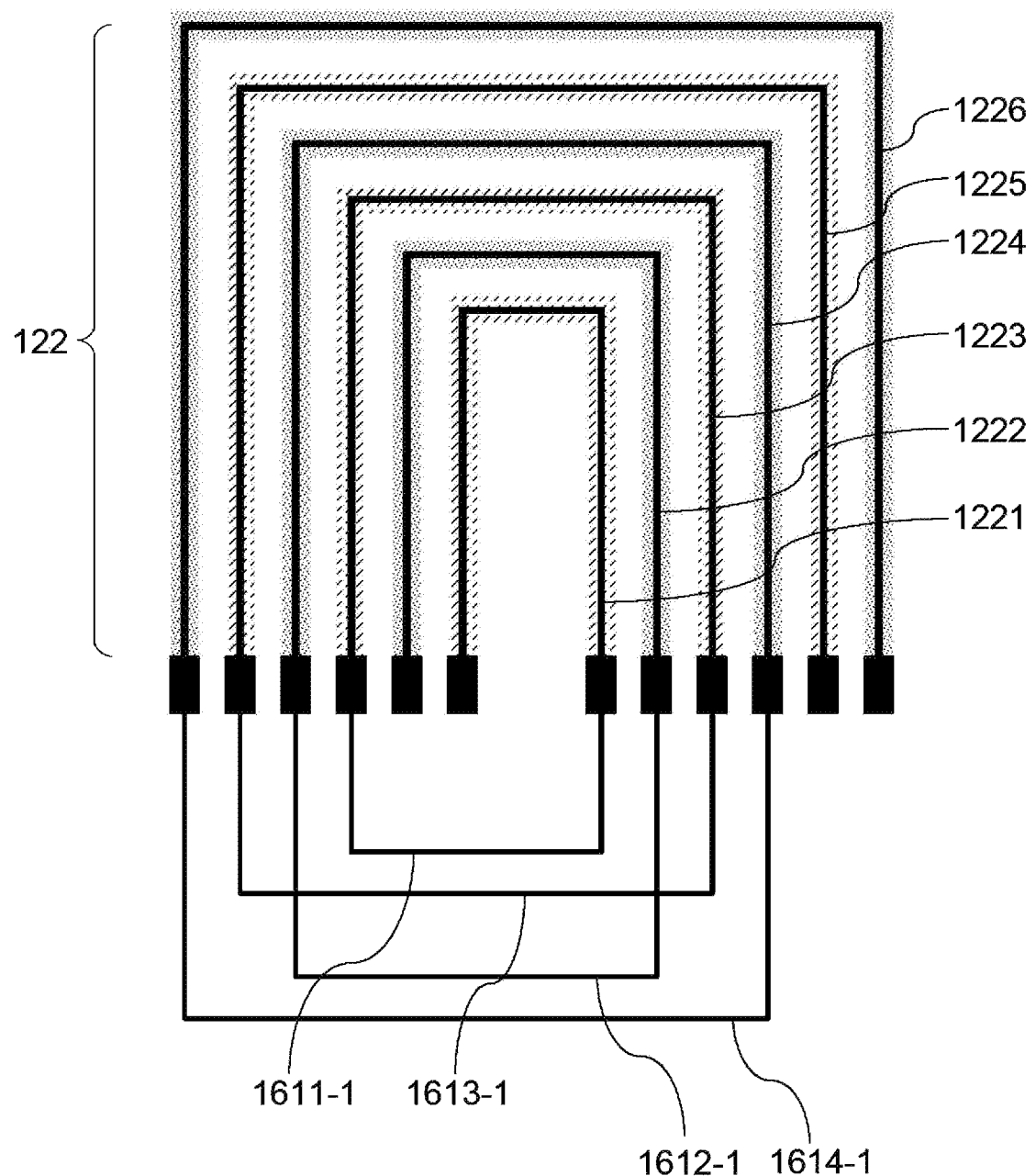
FIG. 9 is a schematic diagram illustrating an antenna configuration example (third example) of the first antenna pattern according to a second embodiment.

FIG. 9 is a schematic diagram illustrating an antenna configuration example (third example) of the first antenna pattern 122 according to the second embodiment. As illustrated in FIG. 9, the connection line 1611-1 connects one end of the antenna wire 1221 to the other end of the antenna wire 1223. The connection line 1613-1 connects one end of the antenna wire 1223 to the other end of the antenna wire 1225. Thus, the antenna wires 1221, 1223 and 1225 constitute a three-turn loop antenna. In addition, the connection line 1612-1 connects one end of the antenna wire 1222 to the other end of the antenna wire 1224. The connection line 1614-1 connects one end of the antenna wire 1224 to the other end of the antenna wire 1226. Thus, the antenna wires 1222, 1224 and 1226 constitute a three-turn loop antenna.

In the example, the antenna wires 1222, 1224 and 1226 constitute a main antenna, and the antenna wires 1221, 1223 and 1225 constitute a repeater antenna.

Fourth Example

Figure 10:
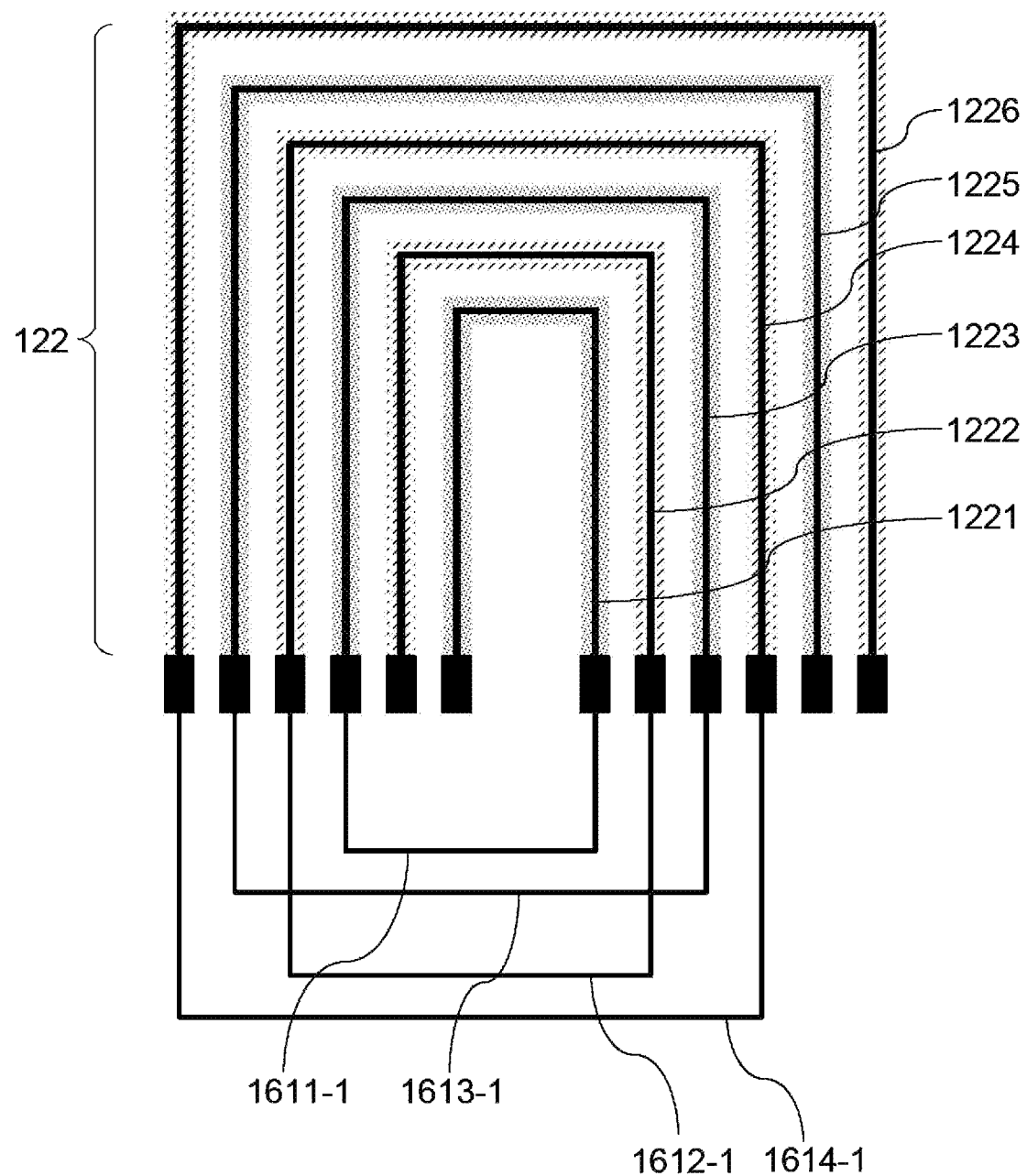
FIG. 10 is a schematic diagram illustrating an antenna configuration example (fourth example) of the first antenna pattern according to the second embodiment.

FIG. 10 is a schematic diagram illustrating an antenna configuration example (fourth example) of the first antenna pattern 122 according to the second embodiment. As shown in FIG. 10, the method of connecting the antenna wires 1221 to 1226 with the connection lines 1611-1 to 1614-1 is the same as in the third example illustrated in FIG. 3. However, in the example, the antenna wires 1221, 1223 and 1225 constitute a main antenna, and the antenna wires 1222, 1224 and 1226 constitute a repeater antenna.

Fifth Example

Figure 11:
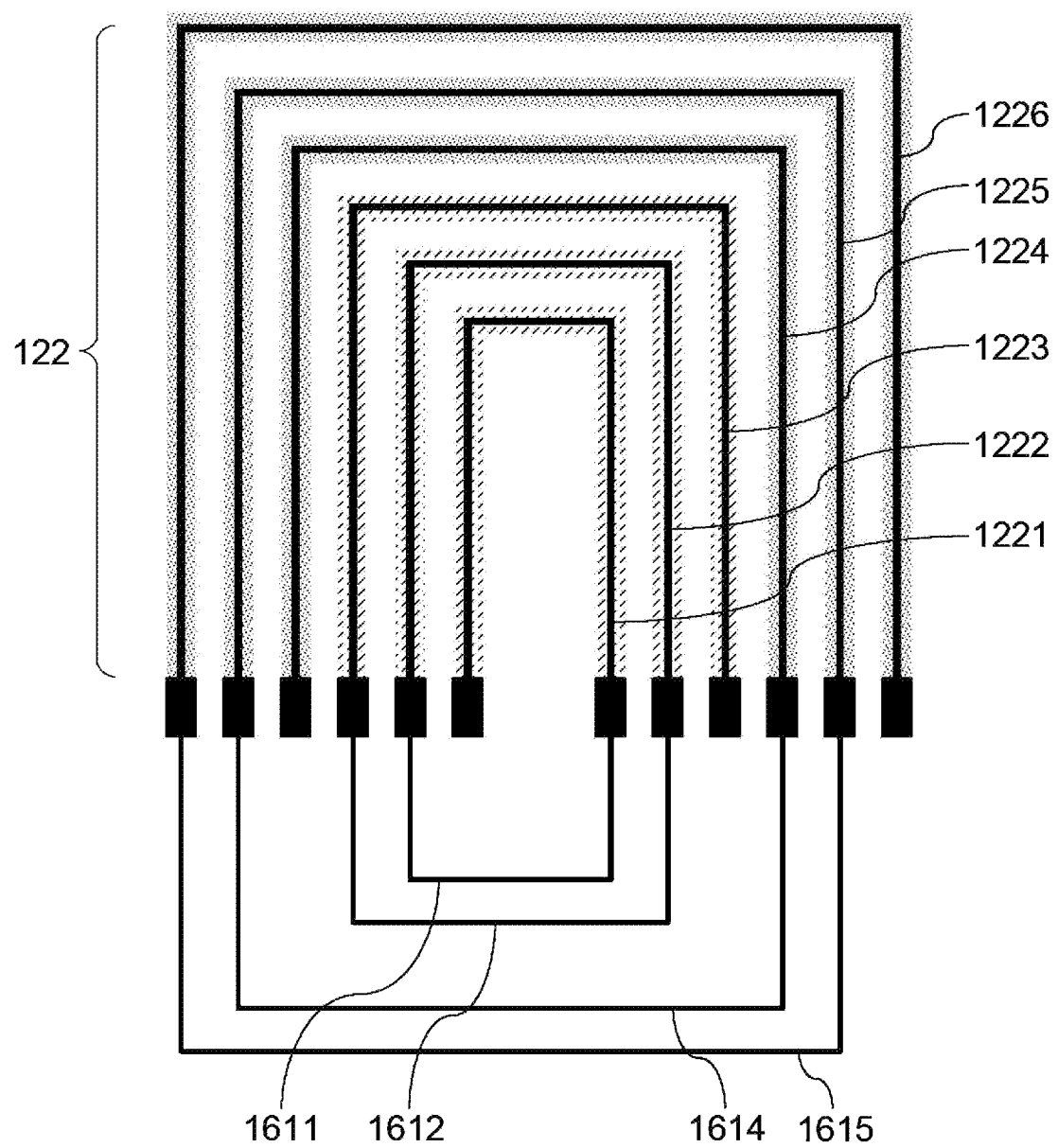
FIG. 11 is a schematic diagram illustrating an antenna configuration example (fifth example) of the first antenna pattern according to the second embodiment.

FIG. 11 is a schematic diagram illustrating an antenna configuration example (fifth example) of the first antenna pattern 122 according to the second embodiment. As illustrated in FIG. 11, the connection line 1611 connects one end of the antenna wire 1221 to the other end of the antenna wire 1222. The connection line 1612 connects one end of the antenna wire 1222 to the other end of the antenna wire 1223. Thus, the antenna wires 1221 to 1223 constitute a three-turn loop antenna. In addition, the connection line 1614 connects one end of the antenna wire 1224 to the other end of the antenna wire 1225. The connection line 1615 connects one end of the antenna wire 1225 to the other end of the antenna wire 1226. Thus, the antenna wires 1224 to 1226 constitute a three-turn loop antenna.

In the example, the antenna wires 1224 to 1226 constitute a main antenna, and the antenna wires 1221 to 1223 constitute a repeater antenna.

Sixth Example

Figure 12:
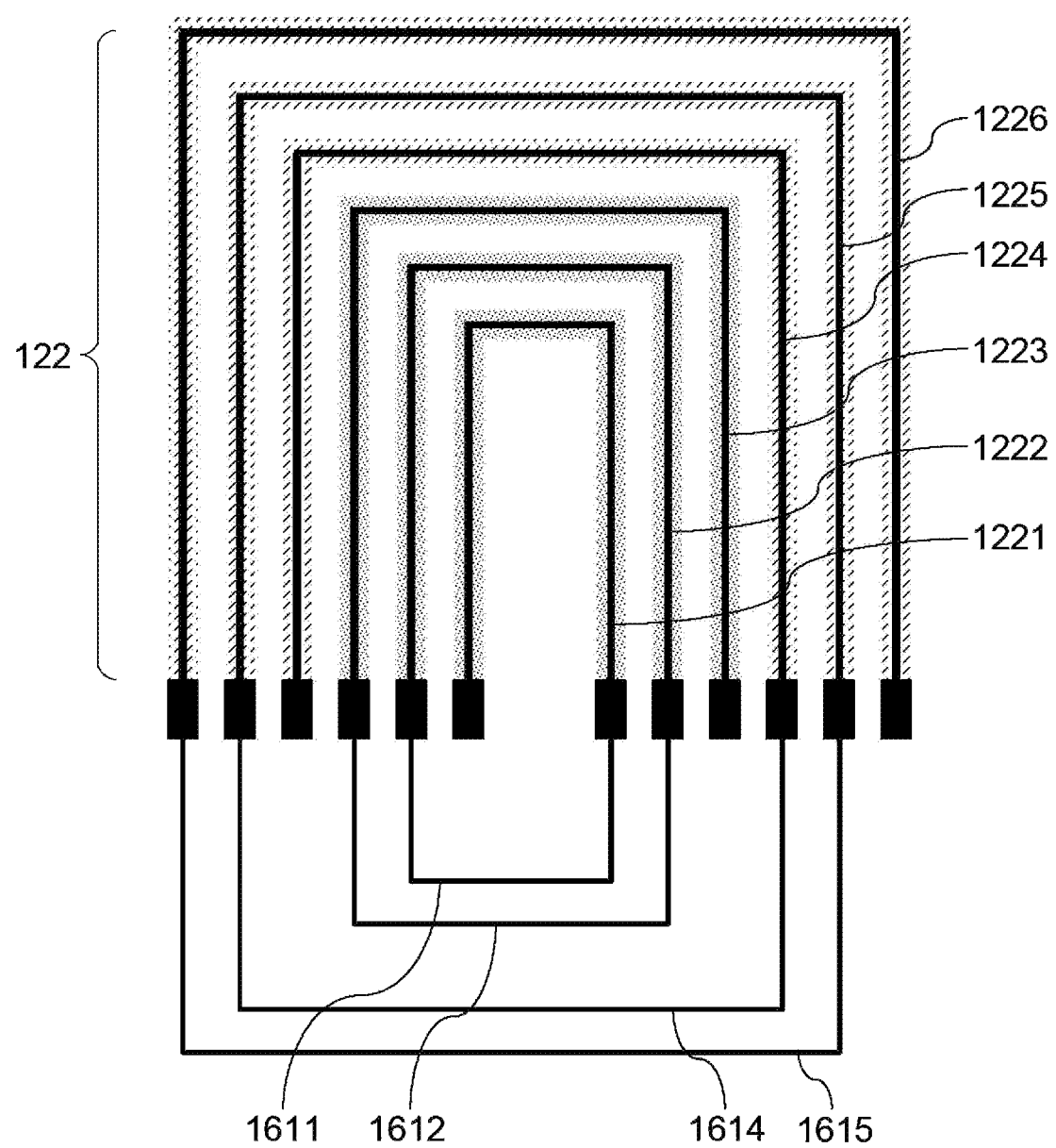
FIG. 12 is a schematic diagram illustrating an antenna configuration example (sixth example) of the first antenna pattern according to the second embodiment.

FIG. 12 is a schematic diagram illustrating an antenna configuration example (sixth example) of the first antenna pattern 122 according to the second embodiment. As shown in FIG. 12, the method of connecting the antenna wires 1221 to 1226 with the connection lines 1611, 1612, 1614 and 1615 is the same as in the fifth example illustrated in FIG. 11. However, in the example, the antenna wires 1221, 1223 to 1223 form a main antenna, and the antenna wires 1224 to 1226 form a repeater antenna.

Performance of Each Example

FIG. 13 is a table showing comparisons between performances of antenna configuration examples in the second embodiment and performances of comparative examples. In FIG. 13, "EMVCo performance" indicates a value of the EMVCo performance. "Current value" indicates a current value when an output voltage value of the "EMVCo performance" is obtained. The "performance of the comparative example" is a performance when only the first antenna pattern 122 is provided on the antenna substrate 121 and the thickness of the antenna wire is 10 μm (twice that of the second embodiment).

As illustrated in FIG. 13, when the same antenna pattern is formed on both surfaces of the antenna substrate 121, the resistance of the antenna is reduced to about the same degree as in the case where the thickness of the antenna wire formed on one surface of the antenna substrate 121 is doubled. Further, in each example of the second embodiment, EMVCo performances (voltage values of 3 V or more) sufficiently satisfying the EMV specifications are obtained.

As described above, according to the configuration of the second embodiment, by forming the same antenna pattern on both surfaces of the antenna substrate 121, it is possible to reduce the resistance and improve the antenna performance without increasing the thickness of the antenna layer. Therefore, it is possible to improve antenna performance while suppressing a decrease in yield and a decrease in viewability.

Further, by constituting the main antenna and the repeater antenna in each of the first antenna pattern 122 and the second antenna pattern 123 formed on both surfaces of the antenna substrate 121, it is possible to obtain the EMVCo performances sufficiently satisfying the EMV specifications.

Third Embodiment

Next, a third embodiment will be described. The third embodiment is the same as the first embodiment and the second embodiment in that the first antenna pattern 122 and the second antenna pattern 123 are formed such that the positions on the front and back of the antenna substrate 121 coincide with each other. The third embodiment is the same as the first embodiment and the second embodiment in that the antenna wires included in the first antenna pattern 122 are connected by the connection lines formed on the FPC board 16 to constitute the antenna and the antenna wires included in the second antenna pattern 123 are connected by the connection lines formed on the FPC board 16 to constitute the antenna.

However, in the third embodiment, a main antenna is constituted on one of the first antenna pattern 122 and the second antenna pattern 123 and a repeater antenna is constituted on the other. Hereinafter, some configuration examples of the antenna according to the third embodiment will be described.

First Example

Figure 14:
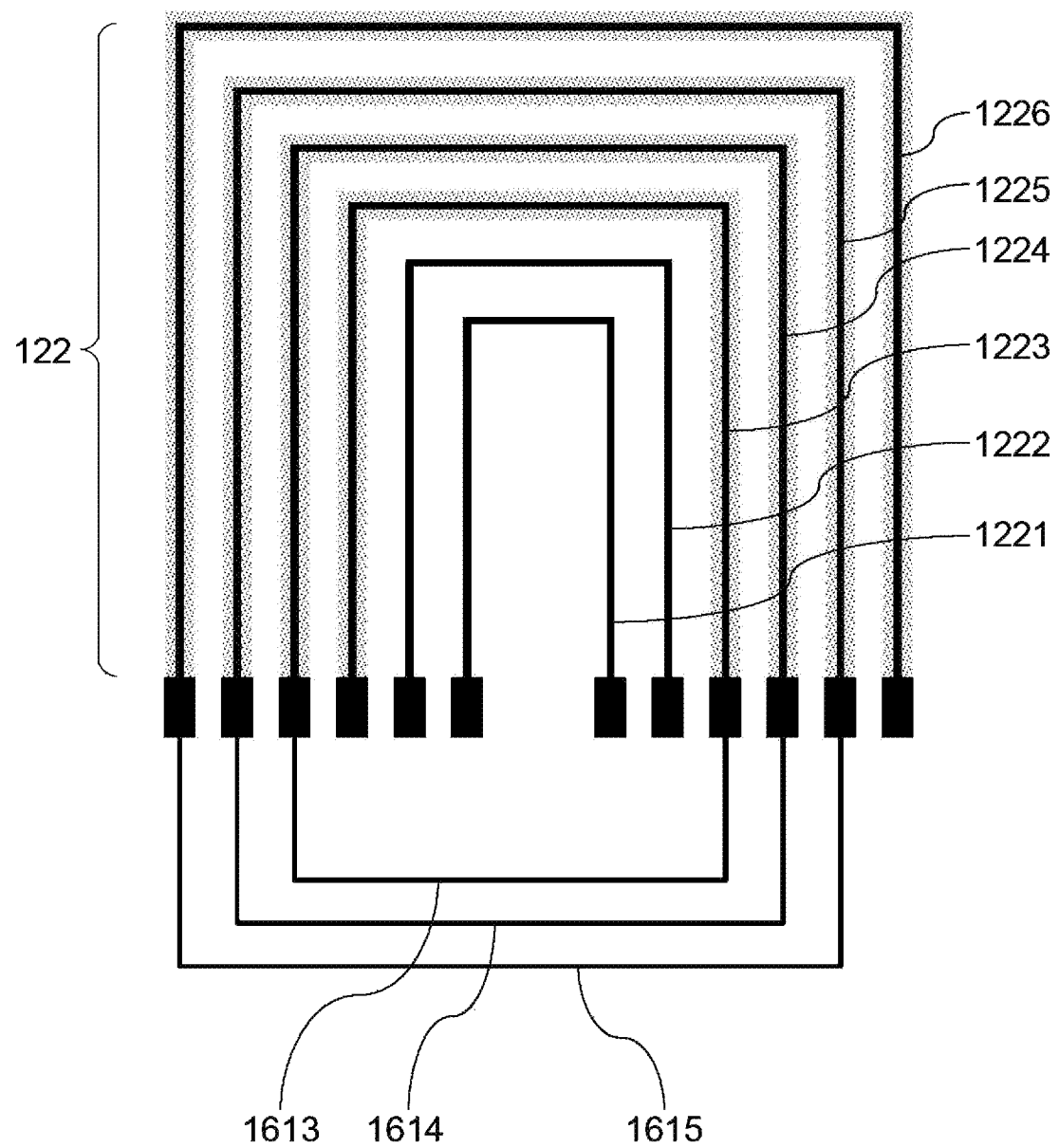
FIG. 14 is a schematic diagram illustrating an antenna configuration example (first example) of the first antenna pattern according to a third embodiment.

FIG. 14 is a schematic diagram illustrating an antenna configuration example (first example) of the first antenna pattern according to the third embodiment. As illustrated in FIG. 14, the connection line 1613 connects one end of the antenna wire 1223 to the other end of the antenna wire 1224. The connection line 1614 connects one end of the antenna wire 1224 to the other end of the antenna wire 1225. The connection line 1615 connects one end of the antenna wire 1225 to the other end of the antenna wire 1226. Thus, the antenna wires 1223 to 1226 constitute a four-turn loop antenna.

Figure 15:
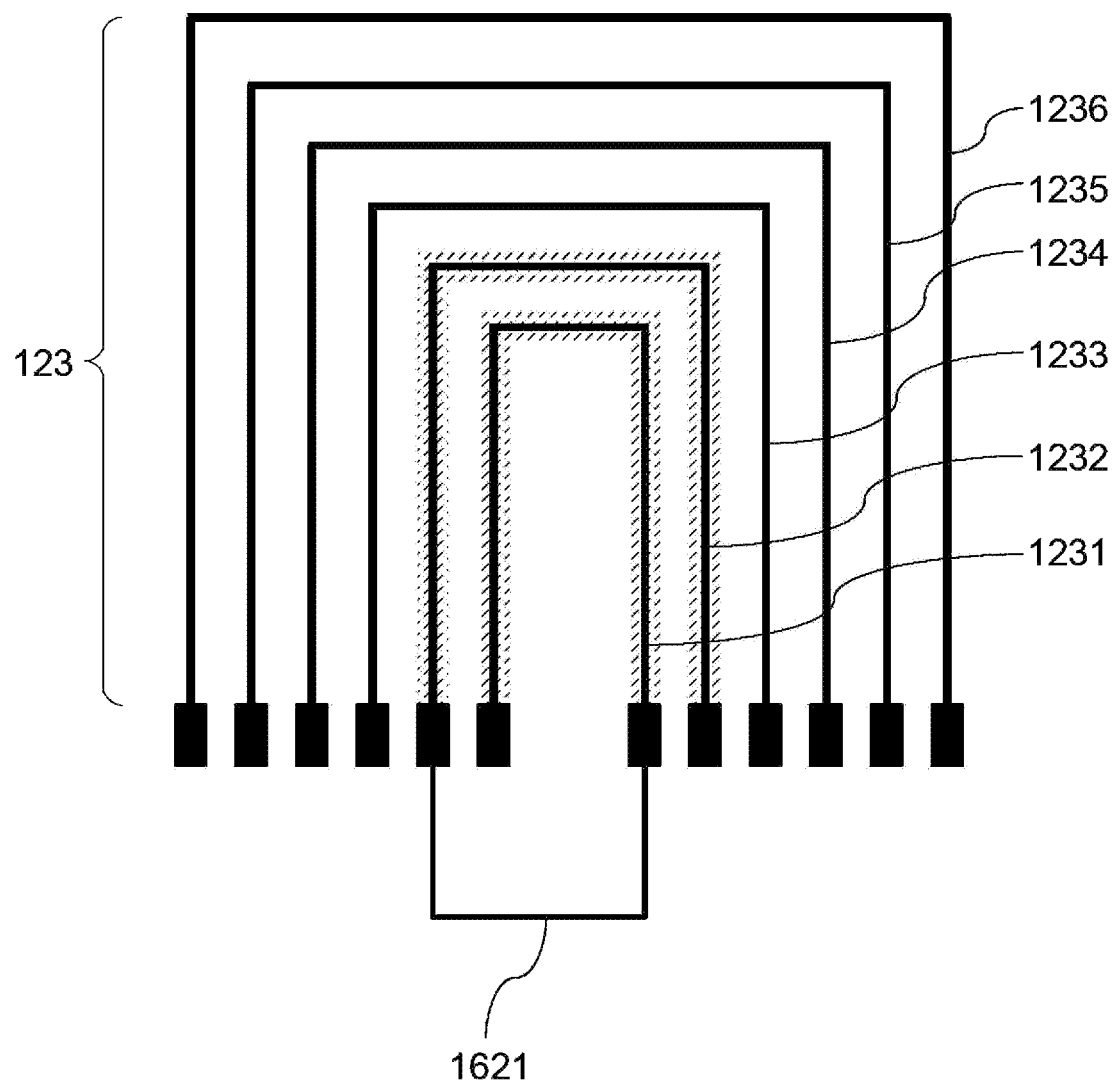
FIG. 15 is a schematic diagram illustrating an antenna configuration example (first example) of a second antenna pattern according to the third embodiment.

FIG. 15 is a schematic diagram illustrating an antenna configuration example (first example) of the second antenna pattern according to the third embodiment. As illustrated in FIG. 15, the connection line 1621 connects one end of the antenna wire 1231 to the other end of the antenna wire 1232. Thus, the antenna wires 1231 and 1232 constitute a two-turn loop antenna.

In the example, the antenna wires 1223 to 1226 constitute a main antenna, and the antenna wires 1231 and 1232 constitute a repeater antenna.

Second Example

Figure 16:
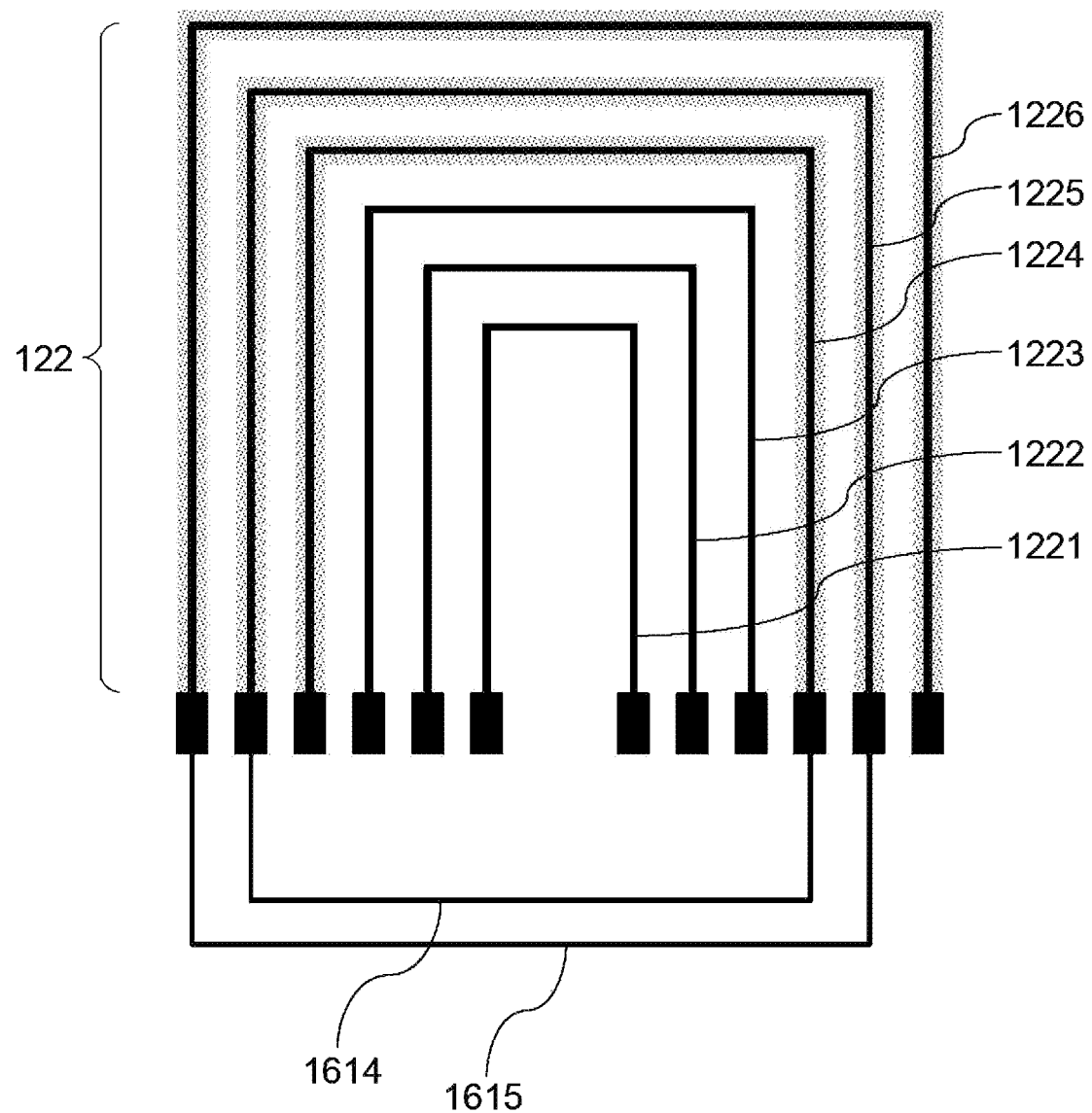
FIG. 16 is a schematic diagram illustrating an antenna configuration example (second example) of the first antenna pattern according to the third embodiment.

FIG. 16 is a schematic diagram illustrating an antenna configuration example (second example) of the first antenna pattern according to the third embodiment. As illustrated in FIG. 16, the connection line 1614 connects one end of the antenna wire 1224 to the other end of the antenna wire 1225. The connection line 1615 connects one end of the antenna wire 1225 to the other end of the antenna wire 1226. Thus, the antenna wires 1224 to 1226 constitute a three-turn loop antenna.

Figure 17:
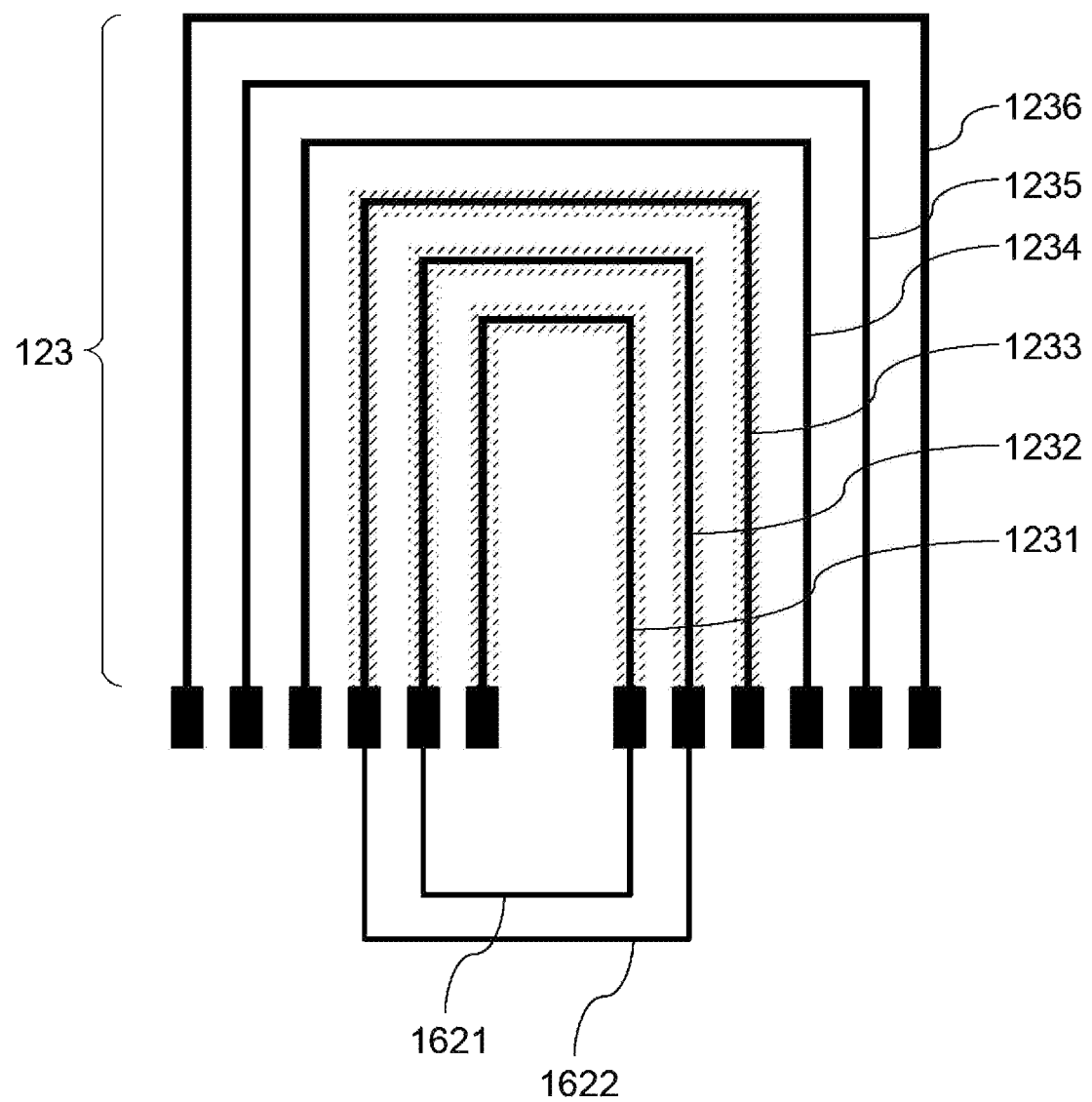
FIG. 17 is a schematic diagram illustrating an antenna configuration example (second example) of the second antenna pattern according to the third embodiment.

FIG. 17 is a schematic diagram illustrating an antenna configuration example (second example) of the second antenna pattern according to the third embodiment. As illustrated in FIG. 17, the connection line 1621 connects one end of the antenna wire 1231 to the other end of the antenna wire 1232. The connection line 1622 connects one end of the antenna wire 1232 to the other end of the antenna wire 1233. Thus, the antenna wires 1231 to 1233 constitute a three-turn loop antenna.

In the example, the antenna wires 1224 to 1226 constitute a main antenna, and the antenna wires 1231 to 1233 constitute a repeater antenna.

Third Example

Figure 18:
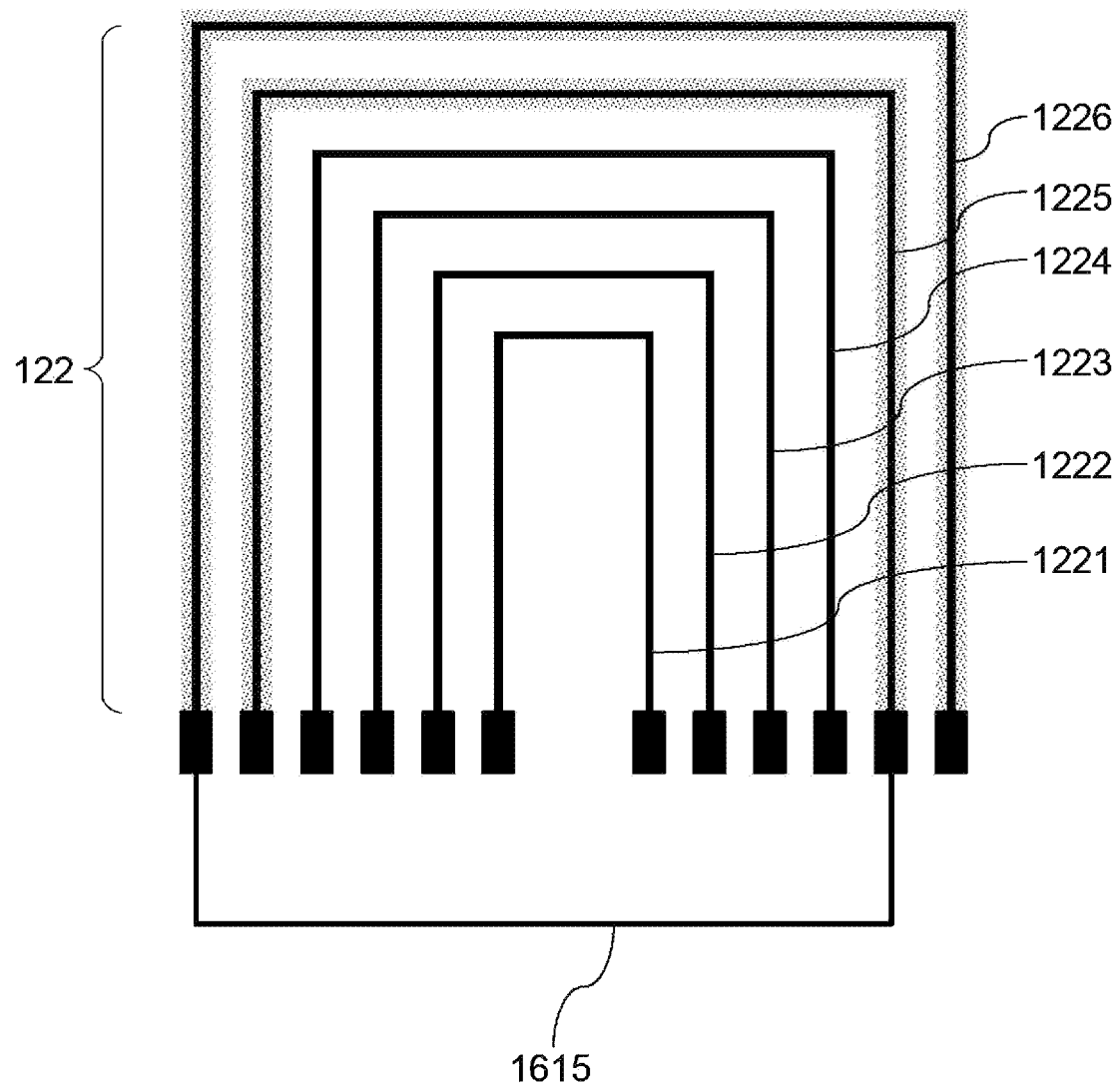
FIG. 18 is a schematic diagram illustrating an antenna configuration example (third example) of the first antenna pattern according to the third embodiment.

FIG. 18 is a schematic diagram illustrating an antenna configuration example (third example) of the first antenna pattern according to the third embodiment. As illustrated in FIG. 18, the connection line 1615 connects one end of the antenna wire 1225 to the other end of the antenna wire 1226. Thus, the antenna wires 1225 and 1226 constitute a two-turn loop antenna.

Figure 19:
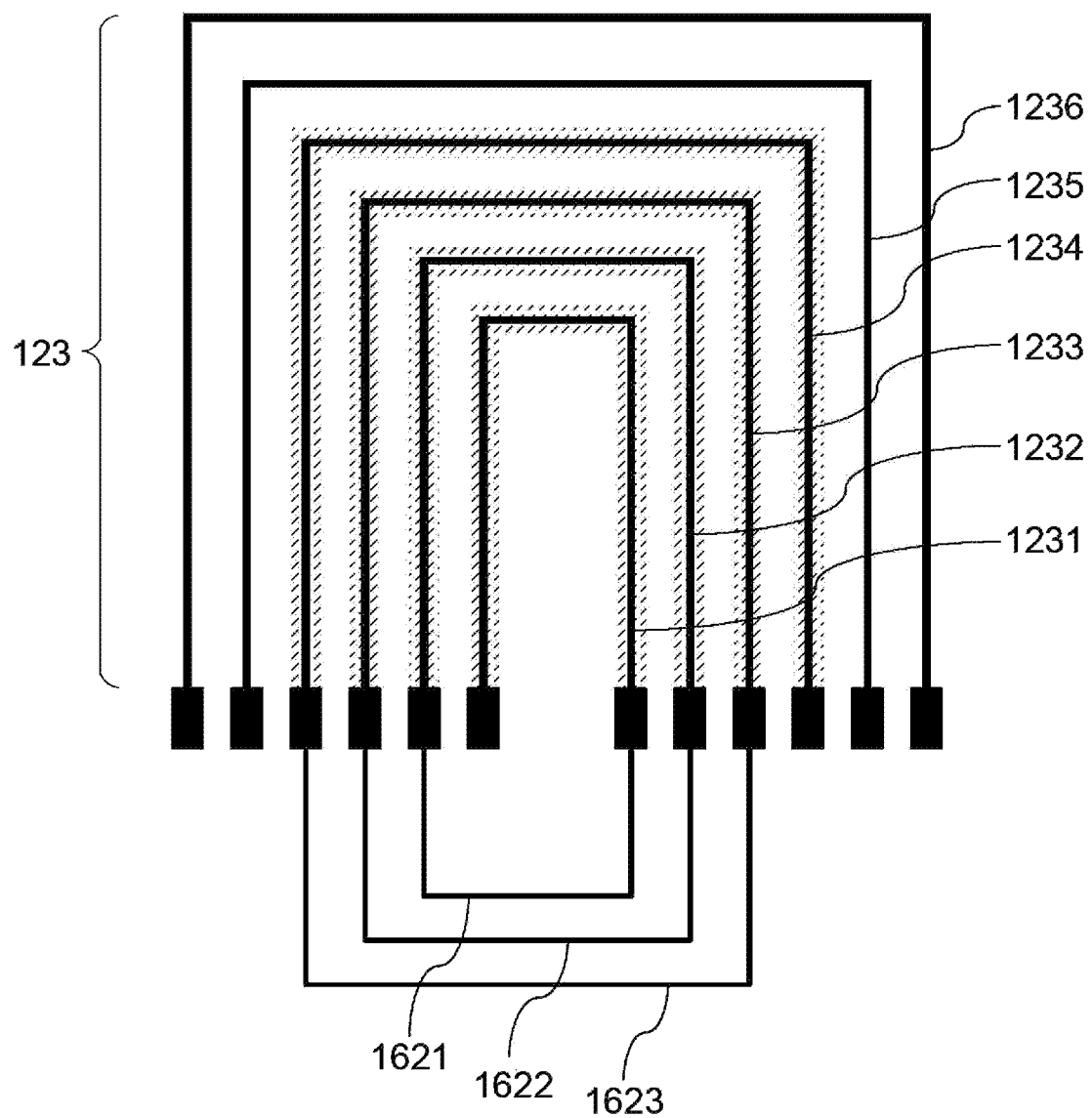
FIG. 19 is a schematic diagram illustrating an antenna configuration example (third example) of the second antenna pattern according to the third embodiment.

FIG. 19 is a schematic diagram illustrating an antenna configuration example (third example) of the second antenna pattern according to the third embodiment. As illustrated in FIG. 19, the connection line 1621 connects one end of the antenna wire 1231 to the other end of the antenna wire 1232. The connection line 1622 connects one end of the antenna wire 1232 to the other end of the antenna wire 1233. The connection line 1623 connects one end of the antenna wire 1223 to the other end of the antenna wire 1234. Thus, the antenna wires 1231 to 1234 constitute a four-turn loop antenna.

In the example, the antenna wires 1225 and 1226 constitute a main antenna, and the antenna wires 1231 to 1234 constitute a repeater antenna.

Fourth Example

Figure 20:
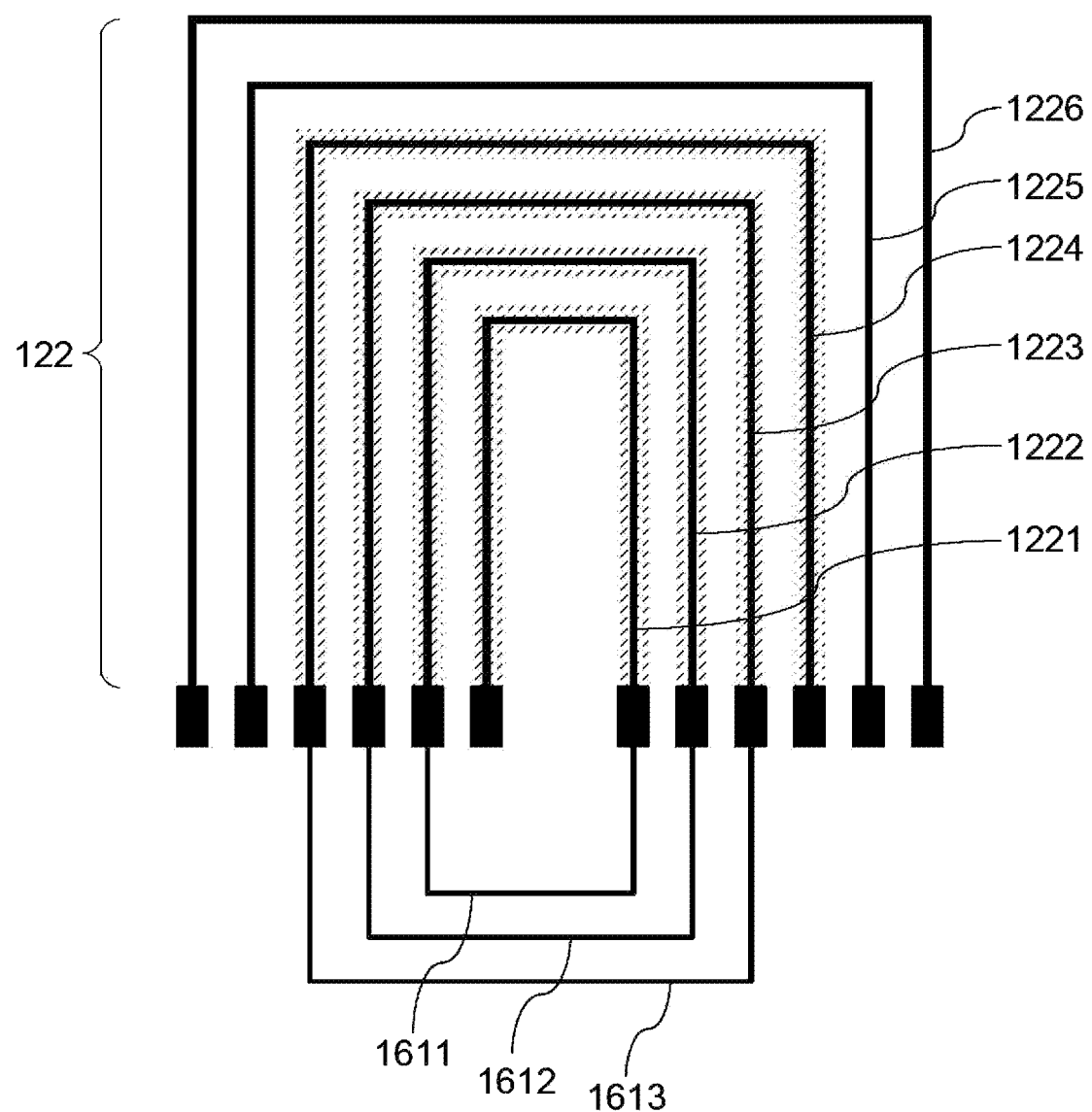
FIG. 20 is a schematic diagram illustrating an antenna configuration example (fourth example) of the first antenna pattern according to the third embodiment.

FIG. 20 is a schematic diagram illustrating an antenna configuration example (fourth example) of the first antenna pattern according to the third embodiment. As illustrated in FIG. 20, the connection line 1611 connects one end of the antenna wire 1221 to the other end of the antenna wire 1222. The connection line 1612 connects one end of the antenna wire 1222 to the other end of the antenna wire 1223. The connection line 1613 connects one end of the antenna wire 1223 to the other end of the antenna wire 1224. Thus, the antenna wires 1221 to 1224 constitute a four-turn loop antenna.

Figure 21:
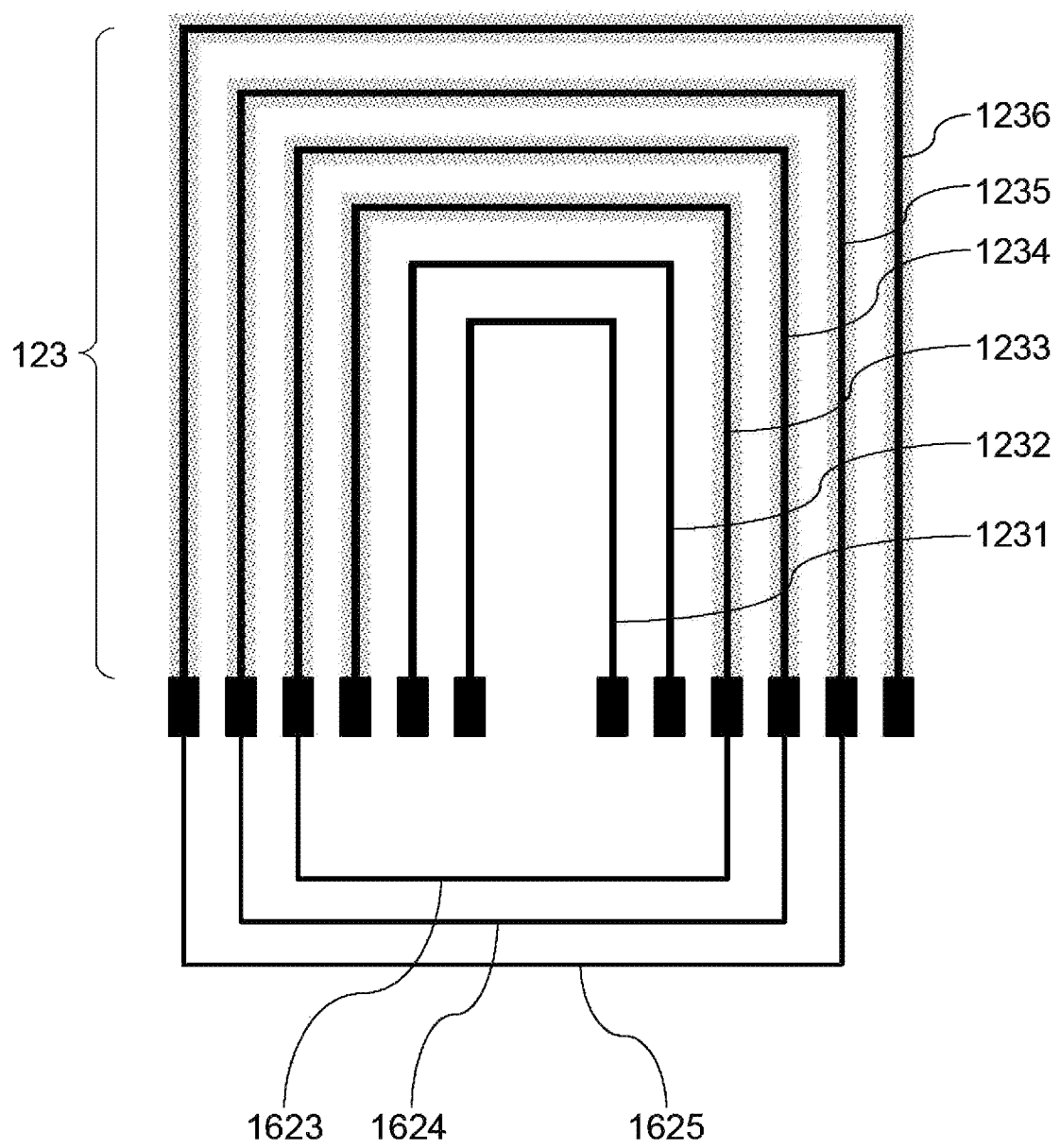
FIG. 21 is a schematic diagram illustrating an antenna configuration example (fourth example) of the second antenna pattern according to the third embodiment.

FIG. 21 is a schematic diagram illustrating an antenna configuration example (fourth example) of the second antenna pattern according to the third embodiment. As illustrated in FIG. 21, the connection line 1623 connects one end of the antenna wire 1233 to the other end of the antenna wire 1234. The connection line 1624 connects one end of the antenna wire 1234 to the other end of the antenna wire 1235. The connection line 1625 connects one end of the antenna wire 1235 to the other end of the antenna wire 1236. Thus, the antenna wires 1233 to 1236 constitute a four-turn loop antenna.

In the example, the antenna wires 1221 to 1224 constitute a main antenna, and the antenna wires 1233 to 1236 constitute a repeater antenna.

Fifth Example

Figure 22:
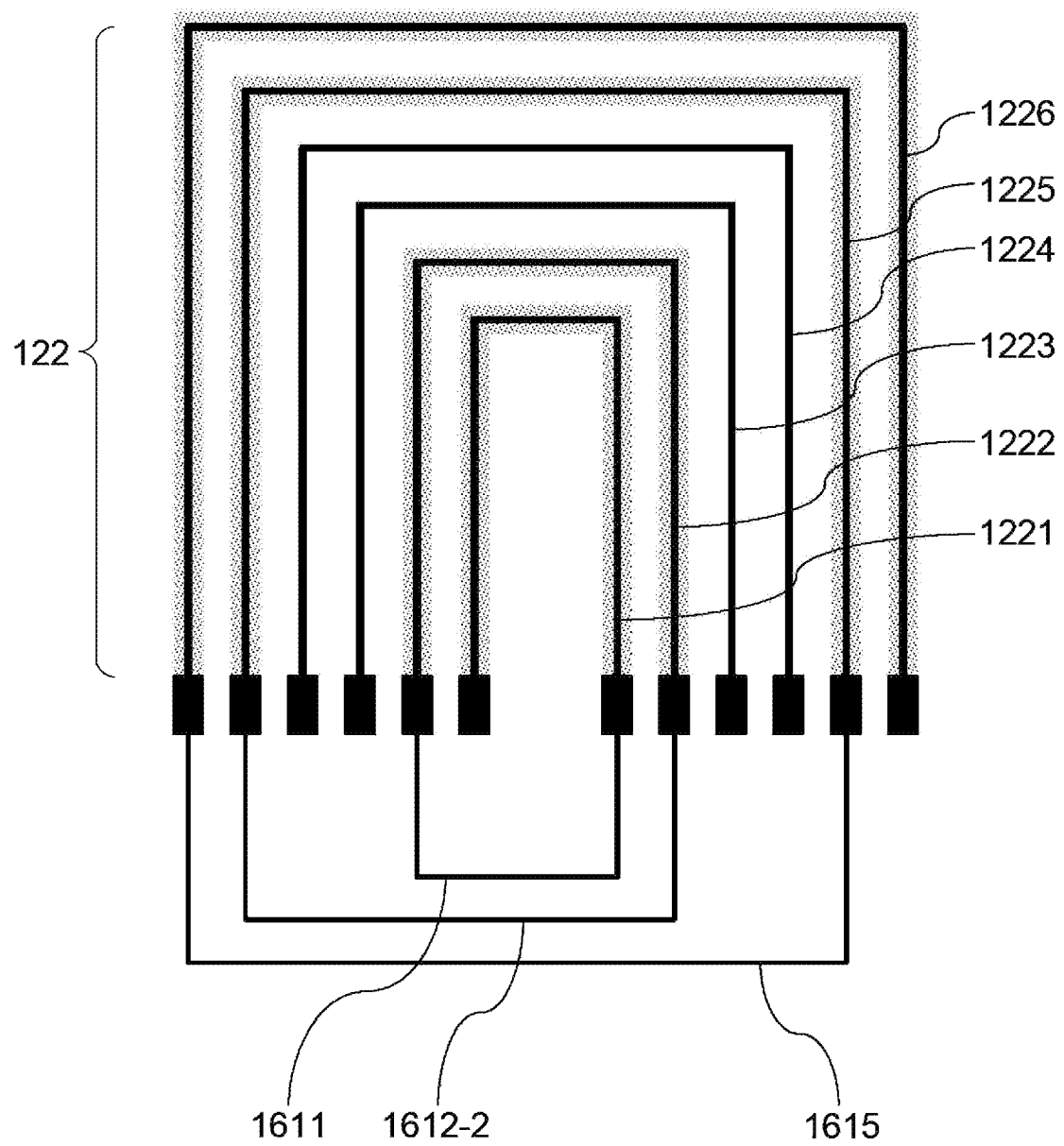
FIG. 22 is a schematic diagram illustrating an antenna configuration example (fifth example) of the first antenna pattern according to the third embodiment.

FIG. 22 is a schematic diagram illustrating an antenna configuration example (fifth example) of the first antenna pattern according to the third embodiment. As illustrated in FIG. 22, the connection line 1611 connects one end of the antenna wire 1221 to the other end of the antenna wire 1222. The connection line 1612-2 connects one end of the antenna wire 1222 to the other end of the antenna wire 1225. The connection line 1615 connects one end of the antenna wire 1225 to the other end of the antenna wire 1226. Thus, the antenna wires 1221, 1222, 1225 and 1226 constitute a four-turn loop antenna.

Figure 23:
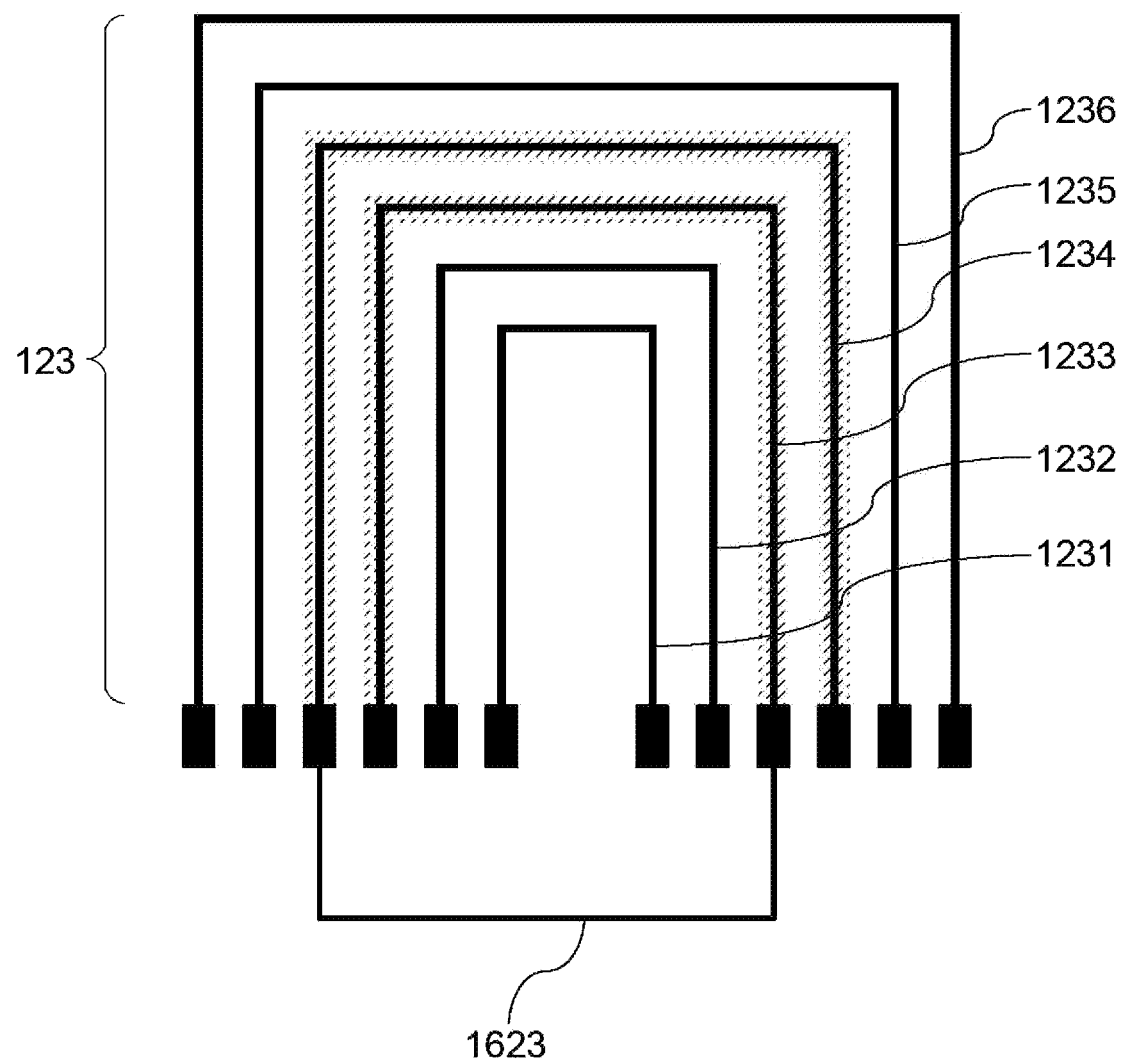
FIG. 23 is a schematic diagram illustrating an antenna configuration example (fifth example) of the second antenna pattern according to the third embodiment.

FIG. 23 is a schematic diagram illustrating an antenna configuration example (fifth example) of the second antenna pattern according to the third embodiment. As illustrated in FIG. 23, the connection line 1623 connects one end of the antenna wire 1233 to the other end of the antenna wire 1234. Thus, the antenna wires 1233 and 1234 constitute a two-turn loop antenna.

In the example, the antenna wires 1221, 1222, 1225 and 1226 constitute a main antenna, and the antenna wires 1233 and 1234 constitute a repeater antenna.

Sixth Example

Figure 24:
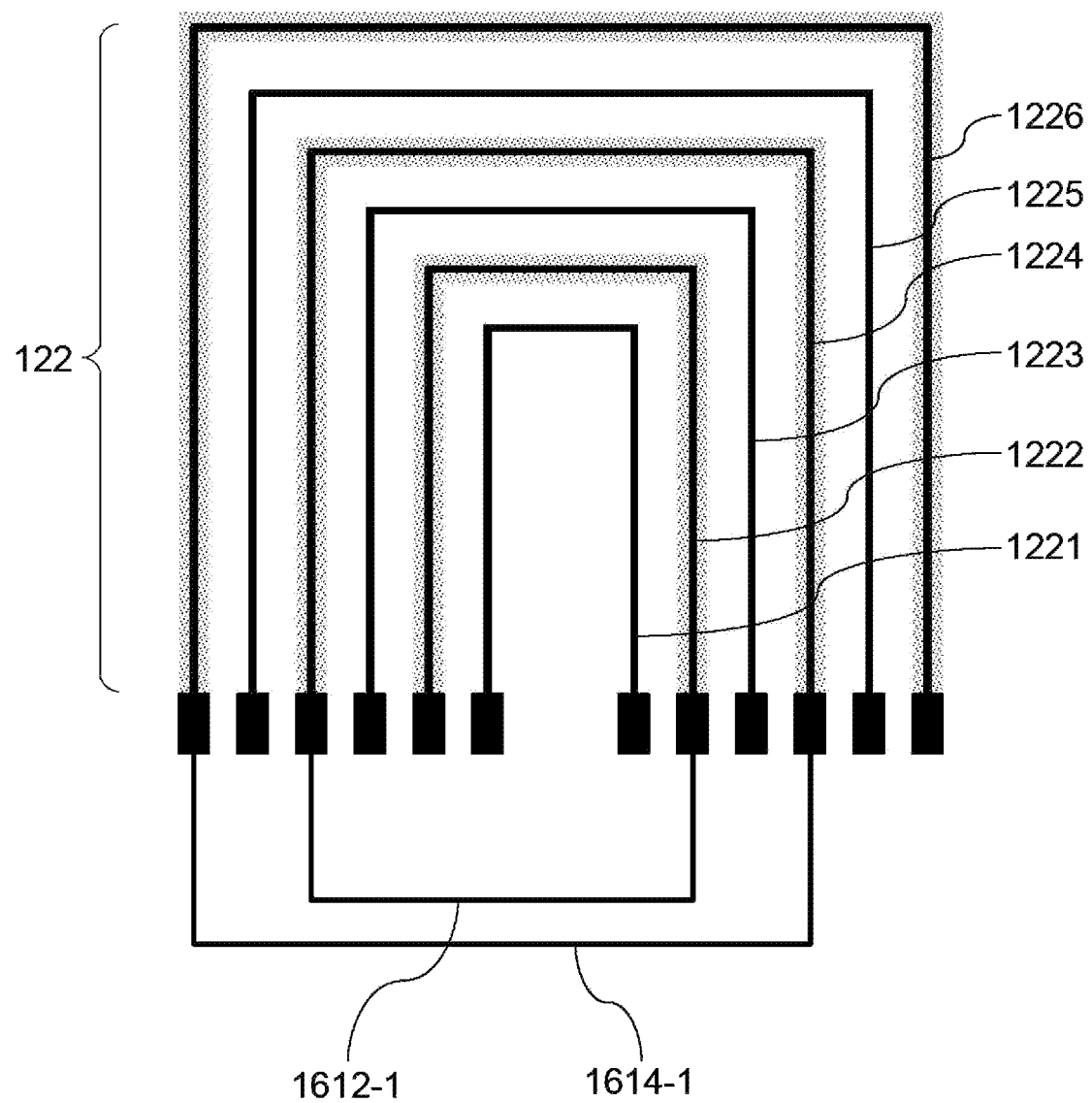
FIG. 24 is a schematic diagram illustrating an antenna configuration example (sixth example) of the first antenna pattern according to the third embodiment.

FIG. 24 is a schematic diagram illustrating an antenna configuration example (sixth example) of the first antenna pattern according to the third embodiment. As illustrated in FIG. 24, the connection line 1612-1 connects one end of the antenna wire 1222 to the other end of the antenna wire 1224. The connection line 1614-1 connects one end of the antenna wire 1224 to the other end of the antenna wire 1226. Thus, the antenna wires 1222, 1224 and 1226 constitute a three-turn loop antenna.

Figure 25:
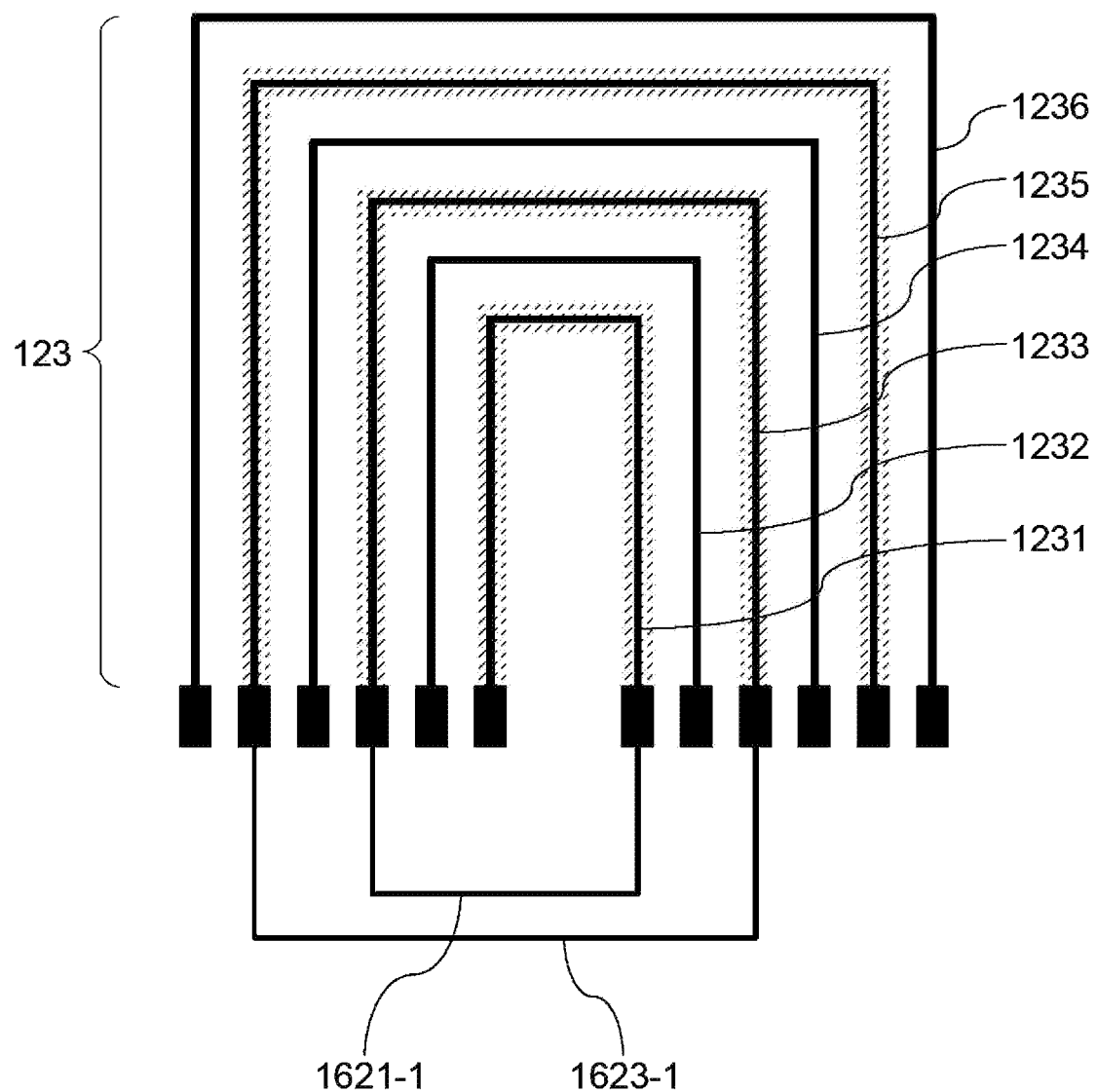
FIG. 25 is a schematic diagram illustrating an antenna configuration example (sixth example) of the second antenna pattern according to the third embodiment.

FIG. 25 is a schematic diagram illustrating an antenna configuration example (sixth example) of the second antenna pattern according to the third embodiment. As illustrated in FIG. 25, the connection line 1621-1 connects one end of the antenna wire 1231 to the other end of the antenna wire 1233. The connection line 1623-1 connects one end of the antenna wire 1233 to the other end of the antenna wire 1235. Thus, the antenna wires 1232, 1233 and 1235 constitute a three-turn loop antenna.

In the example, the antenna wires 1222, 1224 and 1226 constitute a main antenna, and the antenna wires 1231, 1233 and 1235 constitute a repeater antenna.

Performance of Each Example

FIG. 26 is a table showing performances of antenna configuration examples in the third embodiment. As illustrated in FIG. 13, when the same antenna pattern is formed on both surfaces of the antenna substrate 121, the resistance of the antenna is reduced to about the same degree as in the case where the thickness of the antenna wire formed on one surface of the antenna substrate 121 is doubled (see "performances of Comparative Examples in FIG. 13). Further, in each example of the third embodiment, EMVCo performances (voltage values of 3 V or more) sufficiently satisfying the EMV specifications are obtained.

As described above, according to the configuration of the third embodiment, by forming the same antenna pattern on both surfaces of the antenna substrate 121, it is possible to reduce the resistance and improve the antenna performance without increasing the thickness of the antenna layer. Therefore, it is possible to improve antenna performance while suppressing a decrease in yield and a decrease in viewability.

Further, by constituting the main antenna on one of the first antenna pattern 122 and the second antenna pattern 123 and the repeater antenna on the other, it is possible to obtain the EMVCo performances sufficiently satisfying the EMV specifications.

Modified Example

The above embodiments are merely examples for carrying out the present disclosure. Therefore, the present disclosure is not limited to the above-described embodiments, and can be implemented by appropriately modifying the above-described embodiments without departing from the spirit thereof.

Figure 27:
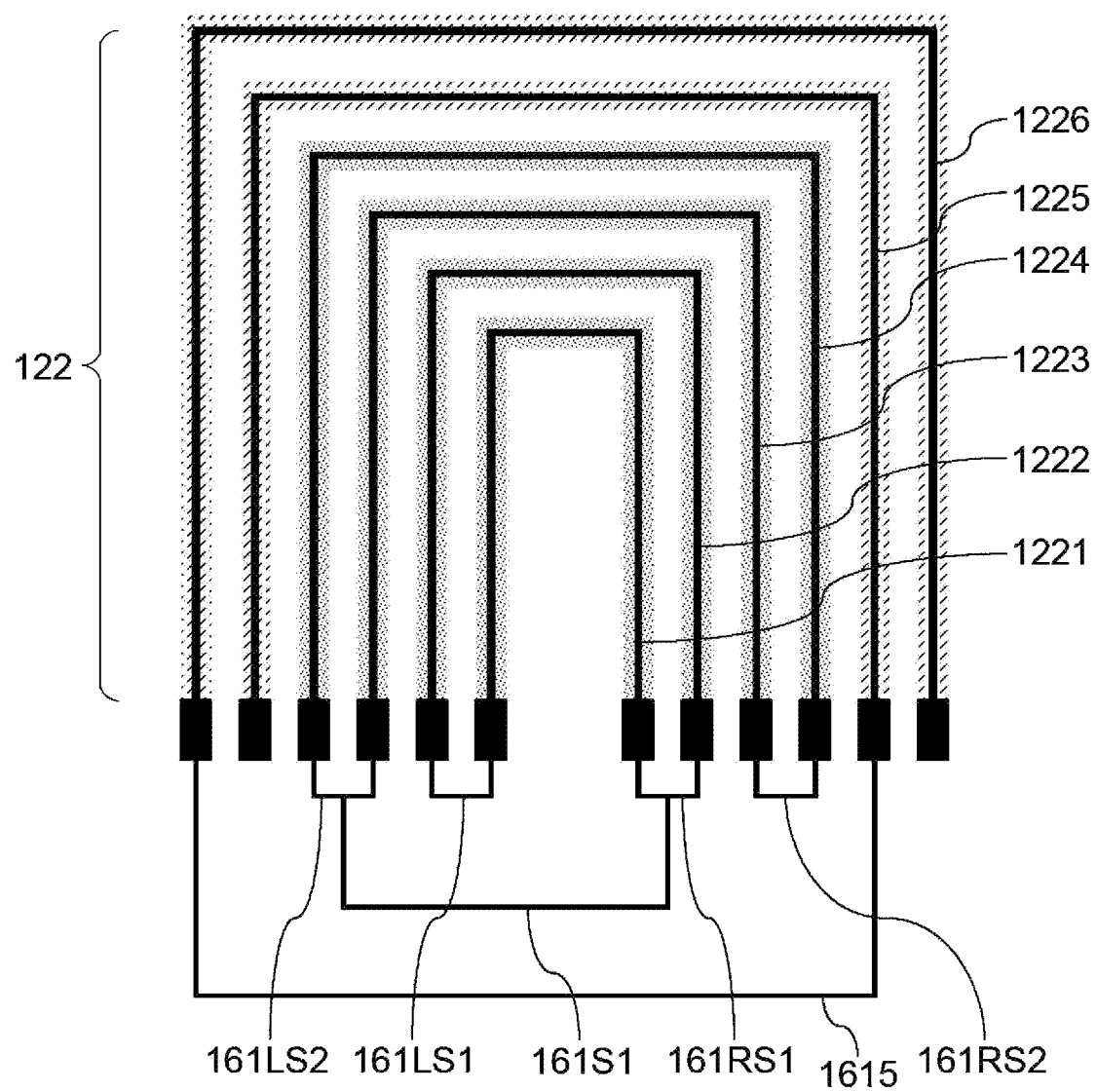
FIG. 27 is a schematic diagram illustrating a modified example of the antenna configuration example (first example) of the first antenna pattern according to the second embodiment.

For example, in each of the embodiments described above, the case where the loop antenna is illustrated with one loop by one antenna wire, but the one loop of the loop antenna may be formed by using a plurality of adjacent antenna wires. FIG. 27 illustrates an example in which the antenna is constituted as described above. FIG. 27 is a schematic diagram illustrating a modified example of a first example (see FIG. 6) of an antenna configuration of the first antenna pattern according to the second embodiment.

As illustrated in FIG. 27, the connection line 161RS1 connects ends of the antenna wire 1221 and the antenna wire 1222 to each other. The connection line 161LS1 connects the other ends of the antenna wire 1221 and the antenna wire 1222 to each other. The connection line 161RS2 connects ends of the antenna wire 1223 and the antenna wire 1224 to each other. The connection line 161LS2 connects the other ends of the antenna wire 1223 and the antenna wire 1224 to each other. The connection line 161S1 connects ends of the antenna wires 1221 and 1222 connected by the connection line 161RS1 to each other, and the other ends of the antenna wires 1223 and 1224 connected by the connection line 161LS2 to each other. Thus, the antenna wires 1221 to 1224 constitute a two-turn loop antenna in which the set of the antenna wires 1221 and 1222 makes one turn, and the set of the antenna wires 1223 and 1224 makes one turn. In addition, the connection line 1615 connects one end of the antenna wire 1225 to the other end of the antenna wire 1226. Thus, the antenna wires 1225 and 1226 constitute a two-turn loop antenna.

In the example, the antenna wires 1221 to 1224 constitute a main antenna, and the antenna wires 1225 and 1226 constitute a repeater antenna.

The EMVCo performance of the example was 3.53 V, and the current value when the output voltage value was obtained was 0.31 A. On the other hand, the EMVCo performance of the first example in the second embodiment was 3.52 V, and the current value when this output voltage value was obtained was 0.317 A. In the example, since the resistance value of the antenna can be decreased by connecting the adjacent antenna wires to each other to form one turn, it is possible to slightly improve the EMVCo performance as compared with the first example in the second embodiment.

In the example, the ends the antenna wires 1225 and 1226 may be connected to each other and the other ends thereof may be connected to each other to constitute a single-turn repeater antenna. Alternatively, ends of three or more adjacent antenna wires and the other ends thereof may be connected to each other to constitute one turn of the loop antenna.

Further, in each of the above-described embodiments, the case is illustrated where the first antenna pattern 122 and the second antenna pattern 123 are formed by linearly patterning the mesh metal to transmit an image and facilitate visual recognition by humans. However, in each of the first antenna pattern 122 and the second antenna pattern 123, portions arranged outside the display area of the liquid crystal module 11 may be formed of a non-meshed metal wire. With the configuration, by using a metal wire in a portion that does not affect the viewability of the image, it is possible to reduce the resistance of the antenna and to improve antenna performance.

Further, in each of the above-described embodiments, the thickness of the antenna wire is set to 5 µm, but this is merely an example, and may be smaller or larger. For example, the thickness of a copper mesh metal that is often used in a capacitive touch panel or the like is about 2 µm, and it may be applied to the above-described embodiments. In this case, since the thickness of the antenna wire is equal to that of the mass-produced mesh metal, it is possible to further improve the yield.

In each of the above-described embodiments, the case where the resonance frequency of the main antenna is 14 MHz and the resonance frequency of the repeater antenna is 20 MHz has been illustrated. However, the resonance frequencies are merely examples, and can be appropriately changed according to the use or purpose of the antenna.

Further, in each of the above-described embodiments, the case where each of the first antenna pattern 122 and the second antenna 10 pattern 123 includes six nested U-shaped antenna wires has been illustrated. However, it is possible to change the shape, the number, the line width and the interval of antenna wires, the number of turns and the position of the constituted antenna, and the like, as needed. For example, the shape of the nested antenna wires may be circular or star-shaped, or seven or more antenna wires may be formed on the antenna substrate 121 to constitute an antenna having seven or more turns. Further, the line widths and intervals of the antenna wires do not necessarily have to be uniform. However, it is desirable that the line widths and intervals of the antenna wires are uniform because it makes the antenna wires less noticeable and the viewability of the image better.

In each of the above-described embodiments, the liquid crystal display device 1 in which the antenna layer 12 is combined with the liquid crystal module 11 has been illustrated. However, the antenna layer 12 in each of the above-described embodiments can be also implemented in combination with another display module such as an organic EL module.

Furthermore, in each of the above-described embodiments, examples have been described as a display device having an antenna layer, but, the present disclosure can be implemented as an antenna device having just an antenna layer without a display module.

The above-described antenna device and a display device provided with the antenna device can be described as follows.

An antenna device includes an antenna substrate, a first antenna pattern formed on a first main surface of the antenna substrate, and a second antenna pattern formed on a second main surface opposite to the first main surface of the antenna substrate, in which the first antenna pattern and the second antenna pattern are formed such that positions on the front and back of the antenna substrate coincide with each other, and at least a part of the antenna substrate is transparent to transmit an image (first configuration).

According to the configuration, by forming the same antenna pattern on both surfaces of the antenna substrate, it is possible to reduce the resistance and improve the antenna performance without increasing the thickness of the antenna layer. Therefore, it is possible to improve antenna performance while suppressing a decrease in yield and a decrease in viewability.

In the first configuration, the first antenna pattern may include a plurality of first conductors and at least one first conductor may be electrically connected to another first conductor to constitute at least one antenna, and the second antenna pattern may include a plurality of second conductor and at least one second conductor may be electrically connected to another second conductor (second configuration).

Further, in the second configuration, the plurality of first conductors included in the first antenna pattern may be a plurality of antenna wires arranged in a nested manner and the plurality of second conductors included in the second antenna pattern may be a plurality of antenna wires arranged in a nested manner (third configuration). According to the configuration, any loop antenna can be achieved by appropriately connecting each of the first conductor and the second conductor.

In the second or third configuration, at least one antenna is constituted, and the connection state of the first conductors and the connection state of the second conductors may coincide with each other on the front and back of the antenna substrate, (fourth configuration).

In any one of the first to fourth configurations, both a main antenna for transmitting and receiving information by near field communication and a repeater antenna are constituted in each of the first antenna pattern and the second antenna pattern (fifth configuration). According to the configuration, it is possible to obtain EMVCo performances sufficiently satisfying the EMV specifications.

In any one of the first to third configurations, a main antenna for transmitting and receiving information by near field communication may be constituted in the first antenna pattern and a repeater antenna may be constituted in the second antenna pattern (sixth configuration). According to the configuration, it is possible to obtain EMVCo performances sufficiently satisfying the EMV specifications.

In any one of the first to sixth configurations, a first connection terminal electrically connected to the first antenna pattern may be formed on the first main surface of the antenna substrate, a second connection terminal electrically connected to the second antenna pattern is formed may be formed on the second main surface of the antenna substrate, and a second connection terminal, and the first connection terminal may be formed at a position different from the second connection terminal on the front and back of the antenna substrate (seventh configuration).

According to the configuration, when a flexible wiring board such as the FPC board is used, just by bending one board and connecting it to each of the first main surface and the second main surface of the antenna substrate, it is possible to electrically connect an external device to each of the first antenna pattern and the second antenna pattern.

Another embodiment of the present disclosure, a display device includes the antenna device according to any one of the first to seventh configurations and a display module that displays an image, in which the antenna device is stacked on a display surface of the display module. (eighth configuration). According to the configuration, it is possible to improve the antenna performance of the antenna device capable of transmitting an image displayed by the display device while suppressing a decrease in yield and a deterioration in viewability.

In the eighth configuration, the antenna device may constitute a main antenna that transmits and receives information by near field communication (ninth configuration). According to the configuration, since the antenna device is provided at a position closer to the display module, it is possible to visually recognize an image and to shorten the communication distance between the person performing near field communication and the antenna device.

In the eighth or ninth configuration, the display module may be stacked on the antenna device, and at least a part of each of the first antenna pattern and the second antenna pattern may be formed of a mesh metal. (tenth configuration). According to the configuration, since the mesh metal has many gaps and the fine metal wire is hard to be visually recognized by a person, even if the metal wire is stacked on the display surface of the display module, it is possible to suppress the deterioration of the viewability of the image.

In the tenth configuration, a portion of each of the first antenna pattern and the second antenna pattern, which is disposed in an area corresponding to the outside of a display area of the display module may be formed of a mesh-free metal wire (eleventh configuration). According to the configuration, by using a metal wire in a portion that does not affect the viewability of the image, it is possible to reduce the resistance of the antenna and to improve antenna performance.

The present disclosure contains subject matter related to that disclosed in U.S. Provisional Patent Application No. 62/816,360 filed in the US Patent Office on Mar. 11, 2019, the entire content of which is hereby incorporated by reference.

It should be understood by those skilled in the art that various modifications, combinations, sub-combinations and alterations may occur depending on design requirements and ether factors insofar as they are within the scope of the appended claims or the equivalents thereof.

What is claimed is:

1. A display device comprising:
   an antenna device; and
   a display module, wherein
   the antenna device is stacked on a display surface of the display module and comprises:
      an antenna substrate;
      a first antenna pattern formed on a first main surface of the antenna substrate; and
      a second antenna pattern formed on a second main surface of the antenna substrate opposite to the first main surface of the antenna substrate, wherein:
      the first antenna pattern and the second antenna pattern are formed such that positions of the first antenna pattern and the second antenna pattern on front and back of the antenna substrate coincide with each other,
      at least a part of the antenna substrate is transparent,
      at least a part of each of the first antenna pattern and the second antenna pattern is formed of a mesh metal, and
      a portion of each of the first antenna pattern and the second antenna pattern that is disposed in an area corresponding to an outside of a display area of the display module is formed of a non-meshed metal wire.

2. The display device according to claim 1, wherein the antenna device constitutes a main antenna for transmitting and receiving information by near field communication.

3. The display device according to claim 1, wherein:
   the first antenna pattern includes a plurality of first conductors, and at least one first conductor is electrically connected to another first conductor to constitute at least a first antenna, and
   the second antenna pattern includes a plurality of second conductors, and at least one second conductor is electrically connected to another second conductor to constitute at least a second antenna.

4. The display device according to claim 3, wherein:
   the plurality of first conductors included in the first antenna pattern comprises a plurality of antenna wires arranged in a nested manner, and
   the plurality of second conductors included in the second antenna pattern comprises a plurality of antenna wires arranged in the nested manner.

5. The display device according to claim 3, wherein a connection state of the plurality of first conductors included in the first antenna pattern and a connection state of the plurality of second conductors included in the second antenna pattern coincide with each other on the front and back of the antenna substrate.

6. The display device according to claim 1, wherein both a main antenna for transmitting and receiving information by near field communication and a repeater antenna are constituted in each of the first antenna pattern and the second antenna pattern.

7. The display device according to claim 1, wherein a main antenna for transmitting and receiving information by near field communication is constituted in the first antenna pattern and a repeater antenna is constituted in the second antenna pattern.

8. The display device according to claim 1, wherein:
   a first connection terminal electrically connected to the first antenna pattern is formed on the first main surface of the antenna substrate,
   a second connection terminal electrically connected to the second antenna pattern is formed on the second main surface of the antenna substrate, and
   the first connection terminal is formed at a position different from the second connection terminal on the front and the back of the antenna substrate.

* * * * *